(12) United States Patent
Une et al.

(10) Patent No.: US 8,620,067 B2
(45) Date of Patent: Dec. 31, 2013

(54) IMAGE PROCESSING APPARATUS AND COMPUTER READABLE MEDIUM

(71) Applicant: Fuji Xerox Co., Ltd., Tokyo (JP)

(72) Inventors: Kiyoshi Une, Saitama (JP); Kouji Yorimoto, Saitama (JP); Yasuo Komatsu, Saitama (JP); Takumi Nishikata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/761,658

(22) Filed: Feb. 7, 2013

(65) Prior Publication Data

US 2013/0148134 A1 Jun. 13, 2013

Related U.S. Application Data

(62) Division of application No. 12/731,646, filed on Mar. 25, 2010.

(30) Foreign Application Priority Data

Aug. 10, 2009 (JP) .................................. 2009-185741

(51) Int. Cl.
*G06K 9/00* (2006.01)

(52) U.S. Cl.
USPC ........... 382/162; 382/168; 382/167; 382/274; 382/271

(58) Field of Classification Search
USPC ......... 382/128, 162, 167, 168, 271, 169, 274; 348/453; 345/589, 591, 593, 597, 604, 345/605; 358/3.23; 250/583
See application file for complete search history.

(56) References Cited

U.S. PATENT DOCUMENTS 5,696,595 A * 12/1997 Yamanishi .................. 358/3.23
5,757,022 A * 5/1998 Kobayashi et al. ........... 250/583
5,841,899 A * 11/1998 Ide et al. ...................... 382/168
6,631,209 B1 10/2003 Kanamori
6,643,397 B1 11/2003 Kanamori
7,940,997 B2 5/2011 Han et al.
2001/0020978 A1 9/2001 Matsui et al.
2007/0104387 A1* 5/2007 Han et al. ..................... 382/271
2008/0170766 A1* 7/2008 Yfantis ......................... 382/128

* cited by examiner

FOREIGN PATENT DOCUMENTS

| JP | A-2001-251551 | 9/2001 |
| JP | A-2004-146914 | 5/2004 |
| JP | A-2006-224454 | 8/2006 |
| JP | A-2006-227444 | 8/2006 |

OTHER PUBLICATIONS

Feb. 6, 2013 Notification of Reasons for Refusal issued in Japanese Application No. 2009-185741 with English-language translation.

* cited by examiner

*Primary Examiner* — Ali Bayat
(74) *Attorney, Agent, or Firm* — Oliff & Berridge, PLC

(57) ABSTRACT

According to an aspect of the invention, an image processing apparatus includes a generating unit, a calculating unit, a receiving unit, and a changing unit. The generating unit generates a plurality of histograms of images with respect to each color based on an input image. The calculating unit calculates a plurality of first image densities of the images from the histograms. The receiving unit receives a content of image quality adjustment performed on the input image. The changing unit changes one of the histograms based on the content of the image quality adjustment. The one of the histogram corresponds to one of the images on which the image quality adjustment is performed. The calculating unit calculates a second image density corresponding to the one the images based on the one of the histogram changed by the changing unit.

5 Claims, 15 Drawing Sheets

IMAGE PROCESSING APPARATUS AND COMPUTER READABLE MEDIUM

This is a Division of application Ser. No. 12/731,646 filed Mar. 25, 2010, which claims the benefit of Japanese Application No. 2009-185741 filed Aug. 10, 2009. The disclosure of the prior applications is hereby incorporated by reference herein in its entirety.

BACKGROUND

1. Technical Field

The present invention relates to an image processing apparatus and a computer readable medium.

2. Related Art

There are printers that calculate and display the total amount of consumption of a recording material that is used for recording an image on a recording medium.

SUMMARY OF THE INVENTION

According to an aspect of the invention, an image processing apparatus includes a generating unit, a calculating unit, a receiving unit, and a changing unit. The generating unit generates a plurality of histograms of images with respect to each color based on an input image. The calculating unit calculates a plurality of first image densities of the images from the histograms. The receiving unit receives a content of image quality adjustment performed on the input image. The changing unit changes one of the histograms based on the content of the image quality adjustment. The one of the histogram corresponds to one of the images on which the image quality adjustment is performed. The calculating unit calculates a second image density corresponding to the one the images based on the one of the histogram changed by the changing unit.

BRIEF DESCRIPTION OF THE DRAWINGS

Exemplary embodiments of the invention will be described in detail based on the following figures, wherein.

DETAILED DESCRIPTION

Figure 1:
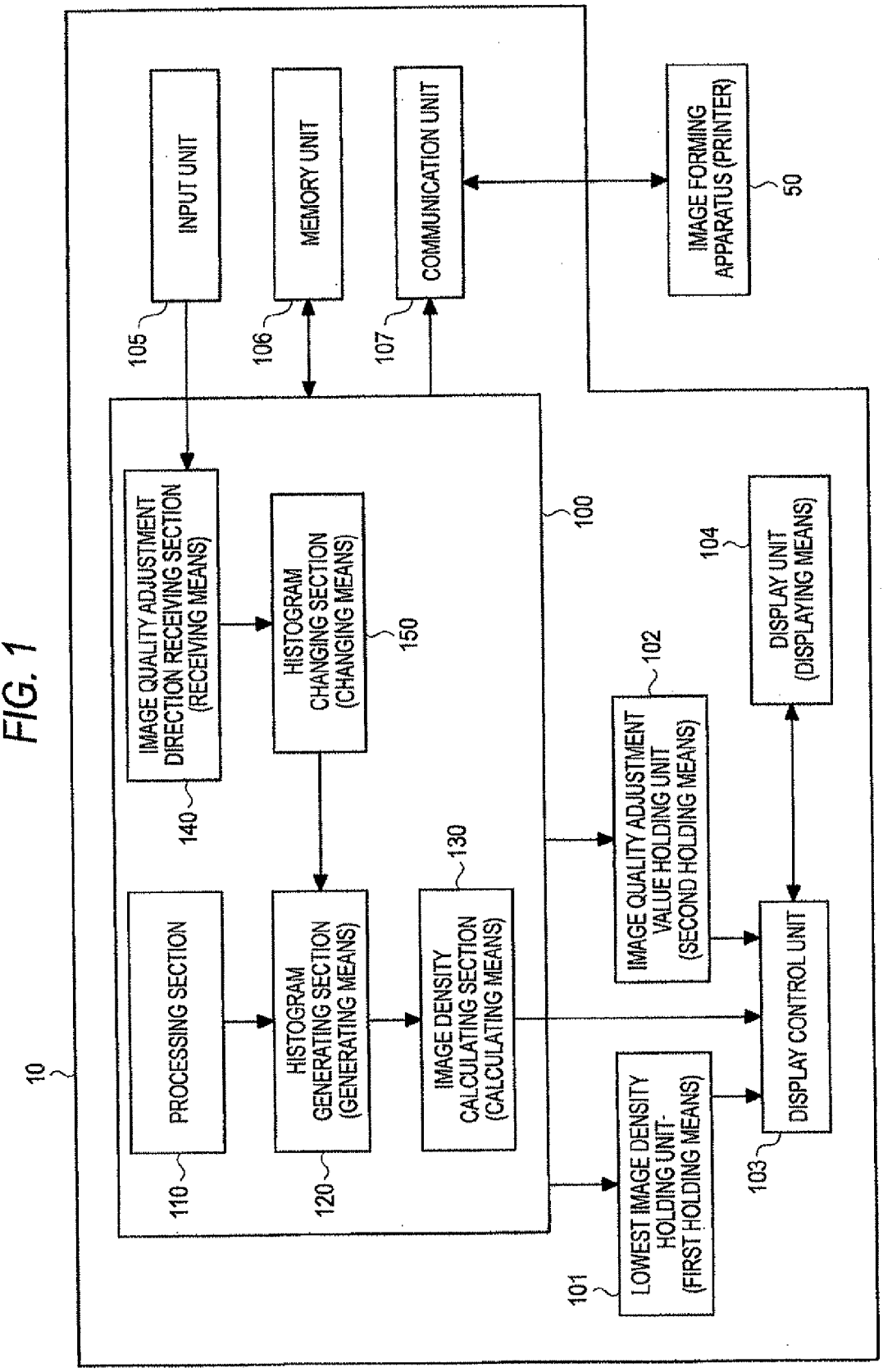
FIG. 1 is a block diagram representing the function of an image processing apparatus according to a first exemplary embodiment.

Hereinafter, exemplary embodiments of the present invention will be described in detail with reference to the accompanying drawings. In the drawings illustrating the embodiments, the same reference numerals in the drawings denote the same elements, and duplicate description will be omitted.

First Exemplary Embodiment

An image processing apparatus according to a first exemplary embodiment will be described.

The image processing apparatus 10, for example, is a computer. The image processing apparatus 10 includes an image processing unit 100, a lowest image density holding unit 101, an image quality adjustment value holding unit 102, a display control unit 103, a display unit 104, an input unit 105, a memory unit 106, and a communication unit 107.

The image processing unit 100 includes a processing section 110, a histogram generating section 120, an image density calculating section 130, an image quality adjustment direction receiving section 140, and a histogram changing section 150.

The processing section 110 simulates image processing that is the same as image processing such as color conversion or tone adjustment that is performed by an image forming apparatus 50 based on color input image data (input image data of RGB) that is stored in the memory unit 106. The processing section 110 will be described later in detail.

The histogram generating section 120 has the function of generating means. The histogram generating section 120 generates histograms for images of each color based on color image data (image data of CMYK) as a result of the simulation performed by the processing section 110.

In a case where the vertical axis represents the frequency, and the horizontal axis represents, this histogram has a characteristic (characteristic representing the number of pixels for each tone value) representing relationship between the frequency (number of pixels) and the tone. The density means the tone (for example, tone values of 0 to 255)

The image density calculating section 130 has the function of calculating means and calculates image densities of images of each color based on the histograms for images of each color that are generated by the histogram generating section 120. Here, the image density corresponds to a printing percentage (or printing rate).

The above-described image density is a value that is acquired by dividing a number of turned-on pixels by a number of entire turned-on pixels.

The turned-on pixel is an accumulative value of values acquired by multiplying each pixel, which is to be turned on (ON), out of all the pixels for an input image having a defined image size by a tone value (for example, any one tone value of 1 to 255) of the corresponding pixel. In other words, the turned-on pixel is a sum of accumulative values of the numbers of pixels for each tone value of the pixels to be turned on.

The entire turned-on pixel is a value acquired by multiplying all the pixels of the input image by a maximum tone value (for example, a tone value of 255) employed as a tone for a case where all the pixels are to be turned on.

In addition, the image density calculating section 130 calculates (recalculates) the image density of an image of a corresponding color based on the histogram after being changed by the histogram changing section 150 to be described later.

The image quality adjustment direction receiving section 140 has the function of receiving means. The image quality adjustment direction receiving section 140 receives the result of image quality adjustment performed for the input image in accordance with the content of the operation performed by the input unit 105.

Here, the image quality adjustment includes adjustment of colors such as hue or saturation, adjustment (color balance adjustment) of color balance, adjustment of sharpness, adjustment of contrast, and the like.

The histogram changing section 150 has the function of changing means. The histogram changing section 150 changes a histogram for an image of a color of which the image quality has been adjusted, out of histograms for images of each color that are generated by the histogram generating section 120 based on the result of image quality adjustment received by the image quality adjustment direction receiving section 140.

According to the first exemplary embodiment, the change of the histogram made by the histogram changing section 150 is to change the tone value of the histogram before image quality adjustment to an output tone value after change in a case where the output tone value corresponding to the input tone value on a default tone reproduction curve (TRC) to be described later is changed based on the result of the image quality adjustment. In addition, the frequency value (the number of pixels) corresponding to the tone value (output tone value) after change is the same as the frequency value (the number of pixels) before the image quality adjustment.

Accordingly, a value acquired by multiplying a tone value after the image quality adjustment by the number of pixels is different from a value acquired by multiplying a tone value before the image quality adjustment by the number of pixels. As a result, the image density that is calculated (recalculated) by the image density calculating section 130 is changed.

The lowest image density holding unit 101 has the function of first holding means. A lowest image density among a plurality of image densities calculated by the image density calculating section 130 is stored in the lowest image density holding unit 101 in a case where the image quality adjustment direction receiving section 140 receives a plurality of results of image quality adjustment having different values in a time series.

In addition, the value of the image density of an initial image relating to an input image is also stored in the lowest image density holding unit 101.

The initial image is an image at the time when values (values set by a user in advance or values set as default values) is used in correspondence with factors determining the image quality such as hue, saturation, color balance, sharpness, and contrast are set. In other words, the initial image is an image at the time when the values set in advance in correspondence with the factors determining the image quality are set as the initially set values or the default values.

The image quality adjustment value holding unit 102 has the function of second holding means and the result of image adjustment at the time of the lowest image density is stored in the image quality adjustment value holding unit 102.

The above-described image processing unit 100 transmits the image density recalculated by the image density calculating section 130 to the display control unit 103. In addition, the image processing unit 100 reads out the image density of the initial image relating to the input image, which is stored in the lowest image density holding unit 101, and the image density of the initial image corresponding to the color of which the image quality is adjusted, acquires a difference between the read-out image density and the recalculated image density, and transmits the acquired value of the difference to the display control unit 103. In addition, the image processing unit 100 stores information to be stored in the lowest image density holding unit 101 and the image quality adjustment value holding unit 102.

The display control unit 103 controls display of display information in the display unit 104. In a case where the result of the image quality adjustment is received by the image quality adjustment direction receiving section 140, the display control unit 103 receives the result from the image processing unit 100 and displays the image density that is calculated by the image density calculating section 130 in the display unit 104.

In addition, in a case where the result of image quality adjustment is received by the image quality adjustment direction receiving section 140, the display control unit 103 displays the value of the difference transmitted from the image processing unit 100 in the display unit 104.

In addition, the display control unit 103 reads out the result of the image quality adjustment from the image quality adjustment value holding unit 102 together with reading out the lowest image density from the lowest image density holding unit 101 and displays the read-out information in the display unit 104.

The display unit 104 has the function of displaying means. In a case where the result of the image quality adjustment is received by the image quality adjustment direction receiving section 140, the display unit 104 displays the image density calculated by the image density calculating section 130.

In addition, in a case where the result of image quality adjustment is received by the image quality adjustment direction receiving section 140, the display unit 104 displays the value of a difference between the image density calculated by the image density calculating section 130 and the image density of the initial image corresponding to the color relating to the image density.

In addition, the display unit 104 displays a value (the lowest image density) stored in the lowest image density holding unit 101 and a value (the result of the image quality adjustment at the time of the lowest image density) stored in the image quality adjustment value holding unit 102.

The input unit 105 designates an input image to be processed, calculates the image density of the input image to be processed, and gives directions to perform image quality adjustment for the input image.

The memory unit 106 stores color image data (input image data of RGB) and the result of image quality adjustment that is received by the image quality adjustment direction receiving section 140. In addition, the memory unit 106 stores the result of processes performed by the histogram generating section 120, the image density calculating section 130, and the histogram changing section 150.

The communication unit 107 performs data communication with the image forming apparatus 50, for example, a printer.

Next, the processing section 110 will be described in detail with reference to FIG. 2.

Figure 2:
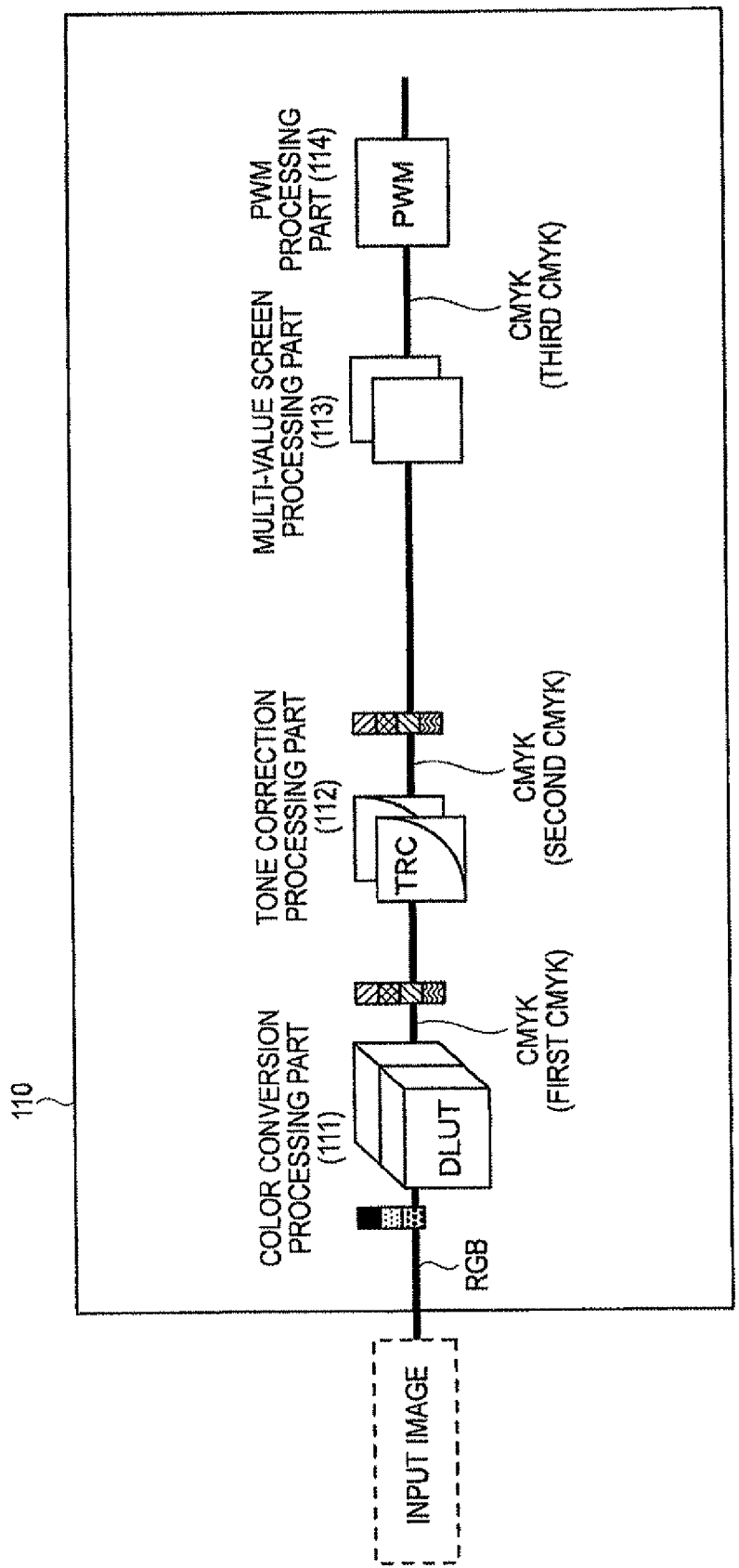
FIG. 2 is a block diagram representing the function of a processing section of an image processing apparatus according to the first exemplary embodiment.

The processing section 110, as shown in FIG. 2, includes a color conversion processing part 111, a tone correction processing part 112, a multi-value screen processing part 113, and a PWM processing part 114.

The color conversion processing part 111 converts RGB image data represented by colors of red (R), green (G), and blue (B) into CMYK image data represented by colors of cyan (C), magenta (M), yellow (Y), and black (K) by referring to a look up table (LUT) of a multiple dimension such as a three dimension that is stored in advance. The CMYK (first CMYK) image data after the color conversion is output to the tone correction processing part 112.

The tone correction processing part 112 corrects the tone of the CMYK image data after the color conversion based on the default tone reproduction curve (TRC). The CMYK (second CMYK) image data after the tone correction is output to the multi-value screen processing part 113.

In a case where the horizontal axis is an input tone, and the vertical axis is an output tone, the tone reproduction curve (TRC) has a characteristic representing relationship between the input tone and the output tone.

The multi-value screen processing part 113 converts the CMYK color image data after the tone correction, for example, multiple value image data (tone data or image data) of m (here, m is a positive integer) bits into multi-value image data (tone data or pixel data) of n (here, n is a positive integer, n<m) bits by using a dither matrix or the like. The CMYK (third CMYK) image data after this conversion is output to the PWM processing part 114.

The PWM processing part 114 performs pulse width modulation (PWM) for the image data (component signal) of each color component of CMYK that is converted by the multi-value screen processing part 113.

According to the first exemplary embodiment, the above-described histogram generating section 120 generates histograms for images of each color of C, M, Y, and K based on the result of the PWM processing of the PWM processing part 114.

In addition, in the first exemplary embodiment, the image processing unit 100 is assumed to be a printer driver. However, the image processing unit 100 is not limited to the printer driver. Thus, the image processing unit 100 may be configured by dedicated software, firmware, or hardware.

A user's operation for giving directions to perform image quality adjustment for the input image will be described.

Figure 3:
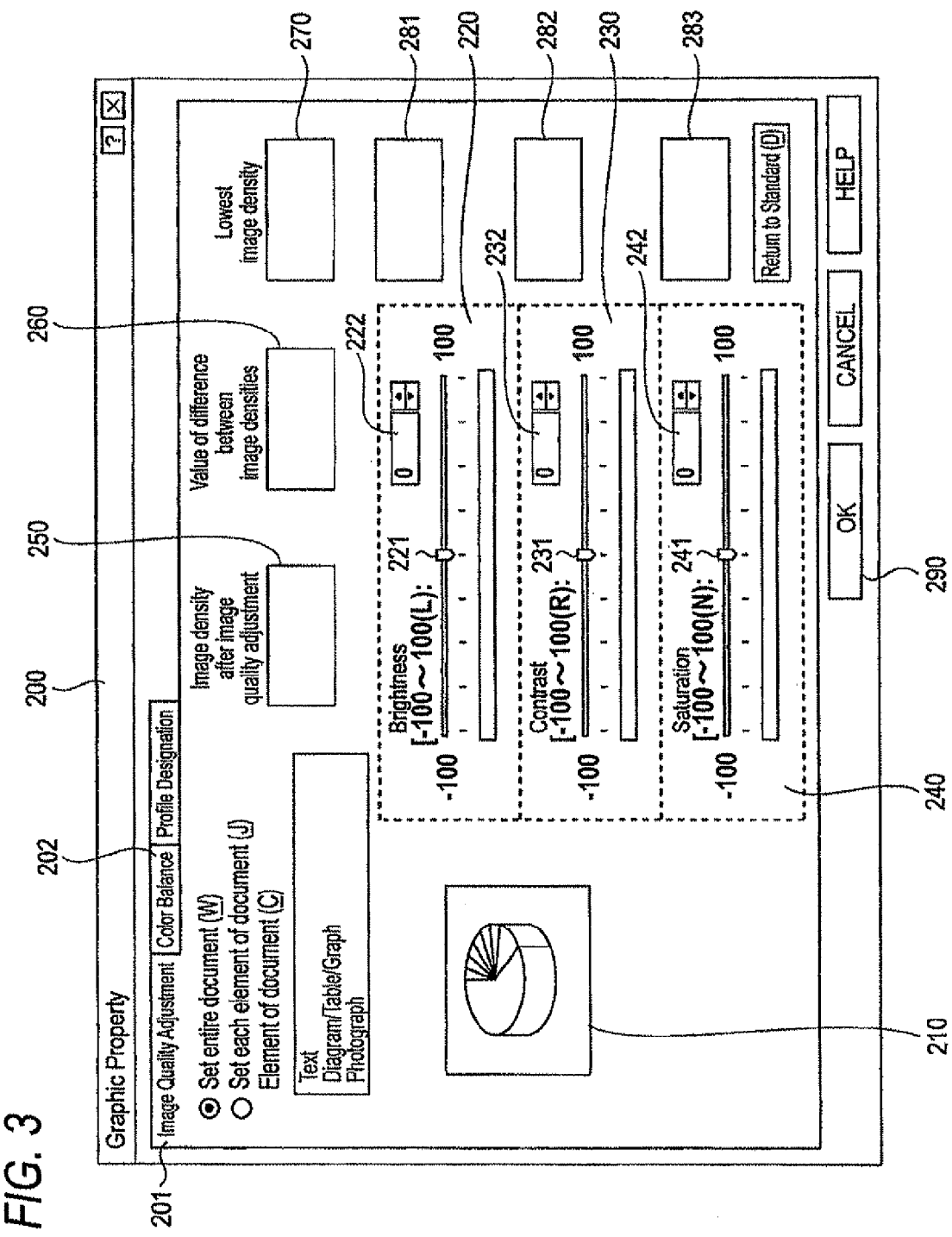
FIG. 3 is a diagram showing an example of a first image quality adjustment screen provided by an image processing unit of an image processing apparatus according to the first exemplary embodiment.

A user performs image quality adjustment on an image quality adjustment screen (first image quality adjustment screen) 200, shown in FIG. 3, that is provided by the image processing unit 100, for example, the printer driver and is displayed in the display unit 104.

The image quality adjustment screen 200 shown in FIG. 3 represents an image quality adjustment screen in a state in which an "image quality adjustment" item (tab) 201 is selected, as a screen of the initial state.

On the image quality adjustment screen 200, a reference numeral 210 represents a reduced input image acquired by reducing the input image, a reference sign 220 represents a brightness adjustment item used for adjusting the brightness, a reference sign 230 represents a contrast adjustment item used for adjusting the contrast, and a reference sign 240 represents a saturation adjustment item that is used for adjusting the saturation. In addition, a reference sign 250 represents a display area in which the recalculated image density is displayed, a reference sign 260 represents a display area in which the value of a difference between the image density of an image of a color of which the image quality is adjusted and the image density of the initial image corresponding to the color, a reference sign 270 represents a display area in which the lowest image density is displayed in a case where image quality adjustment is performed several times, and reference signs 281 to 283 represent values (results of image quality adjustment) indicating the brightness, the contrast, and the saturation at the time of the lowest image density.

A user adjusts the value of the brightness by moving a slide bar 221 of the brightness adjustment item 220 to the right side (+100 side) or to the left side (−100 side). The value of the brightness after adjustment is displayed in a brightness value display field 222. Here, the adjustment range of the brightness is set to "−100" to "+100". The slide bar 221 is positioned at the center (a portion corresponding to a value of "0") of the adjustment range of the brightness in correspondence with the initially set value of the brightness at a time point when the image quality adjustment screen 200 is displayed.

In addition, the user adjusts the value of the contrast by moving a slide bar 231 of the contrast adjustment item 230 to the right side (+100 side) or to the left side (−100 side). The value of the contrast after adjustment is displayed in a contrast value display field 232. Here, the adjustment range of the contrast is set to "−100" to "+100". The slide bar 231 is positioned at the center (a portion corresponding to a value of "0") of the adjustment range of the contrast in correspondence with the initially set value of the contrast at a time point when the image quality adjustment screen 200 is displayed.

In addition, the user adjusts the value of the saturation by moving a slide bar 241 of the saturation adjustment item 240 to the right side (+100 side) or to the left side (−100 side). The value of the saturation after adjustment is displayed in a saturation value display field 242. Here, the adjustment range of the saturation is set to "−100" to "+100". The slide bar 241 is positioned at the center (a portion corresponding to a value of "0") of the adjustment range of the saturation in correspondence with the initially set value of the saturation at a time point when the image quality adjustment screen 200 is displayed.

In a case where the color balance adjustment included in the image quality adjustment is performed, the user selects a "color balance" item (tab) 202 on the image quality adjustment screen 200.

Figure 4:
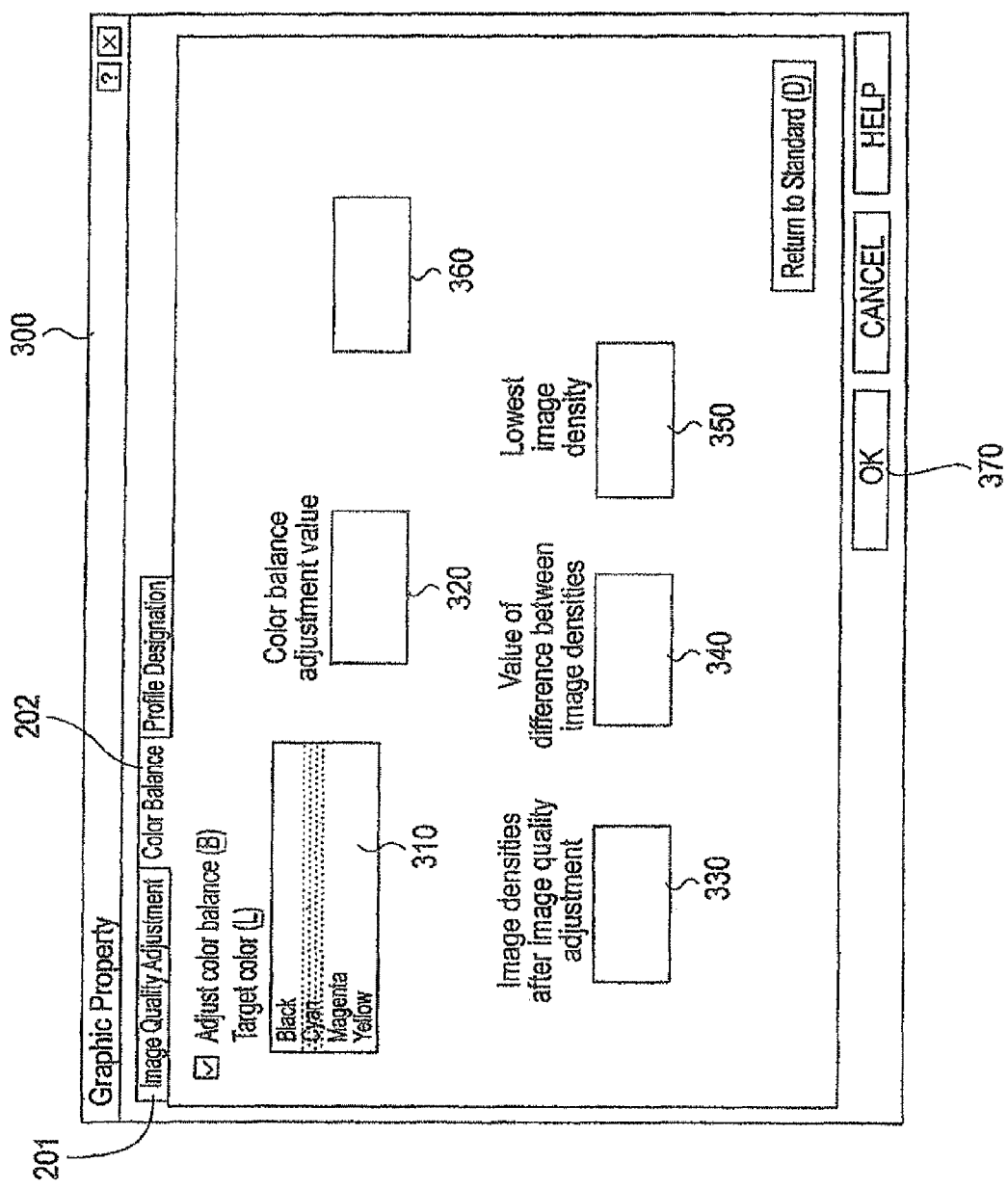
FIG. 4 is a diagram showing an example of a second image quality adjustment screen provided by an image processing unit of an image processing apparatus according to the first exemplary embodiment.

Then, the image quality adjustment screen 200 that is displayed in the display unit 104 is changed to an image quality adjustment screen (second image quality adjustment screen) 300 shown in FIG. 4.

On the image quality adjustment screen 300, a reference sign 310 represents a color designation item used for designating a specific color out of a list of colors (black, cyan, magenta, and yellow) of which the color balance is to be adjusted, and a reference sign 320 represents a color balance adjustment item used for adjusting the color balance of the designated color. In addition, a reference sign 330 represents a display area in which the recalculated image density is displayed, a reference sign 340 represents a display area in which the value of a difference between the image density of an image of a color of which the image quality is adjusted and the image density of the initial image corresponding to the color relating to the image density, a reference sign 350 represents a display area in which the lowest image density is displayed in a case where image quality adjustment is performed several times, and reference sign 360 represents a value (result of image quality adjustment) indicating the color balance at the time of the lowest image density.

The user adjusts the value of the color balance by designating a specific color in the color designation item 310 and inputting a desired value in the color balance adjustment item 320. In the color balance adjustment item 320, a value of "0" is displayed in correspondence with the initially set value of the color balance at a time point when the image quality adjustment screen 300 is displayed.

In a case where at least one of the brightness adjustment item 220, the contrast adjustment item 230, and the saturation adjustment item 240 is adjusted (image quality adjustment) on the image quality adjustment screen 200 shown in FIG. 3 and an "OK" button 290 is pressed down in accordance with a user's operation of the input unit 105, the value in the item of which the image quality is adjusted is transmitted to the image processing unit 100 through the display control unit 103.

In addition, in a case where the color balance adjustment item 320 is adjusted (image quality adjustment) on the image quality adjustment screen 300 shown in FIG. 4, and an "OK" button 370 is pressed down in accordance with a user's operation of the input unit 105, the value in the color balance adjustment item 320 is transmitted to the image processing unit 100 through the display control unit 103.

Next, an image density calculating process of the image processing apparatus 10 will be described with reference to FIG. 5.

In a case where the image density of an image (input image) to be processed is desired to be calculated, a user designates a marker (for example, a file name or the like) representing an input image (an input image of a defined image size) to be processed and inputs calculation of the image density of the input image by operating the input unit 105. The input information input by the user is transmitted to the image processing unit 100 from the input unit 105.

In the image processing unit 100, the processing section 110 reads out the input image data (RGB image data of a defined image size) that is designated to be processed from the memory unit 106 and performs simulation of image processing for the read-out input image (Step S101). The result of this simulation is the CMYK image data.

The histogram generating section 120 generates histograms for images of each of CMYK colors of the initial image based on the input image data (CMYK image data) that is the result of simulation performed by the processing section 110 (Step S102).

The image density calculating section 130 calculates the image density of an image of each of CMYK colors based on the histograms for the images of each of the CMYK colors generated as described above (Step S103).

In a case where the image density is calculated by the image density calculating section 130 as described above, the image processing unit 100 stores the calculated image density (the image density of the lowest value at the current time point, and the image density of the initial image for the input image) in the lowest image density holding unit 101 and stores the result (a value corresponding to the initially set value at the current time point) of the image quality adjustment at the time of the image density in the image quality adjustment value holding unit 102. In addition, the image density is an image density for each of the CMYK colors, and the result of the image quality adjustment is a result of image quality adjustment for each of the CMYK colors.

The image processing unit 100 that has calculated the image density as described above displays the image quality adjustment screen 200 shown in FIG. 3 in the display unit 104 through the display control unit 103 (Step S104).

Then, for example, in a case where at least one element of the brightness, the contrast, and the saturation is adjusted with reference to a reduced input image 210 displayed on the image quality adjustment screen 200, the user sets a desired value by moving a slide bar of the adjustment item corresponding to the element to be adjusted out of the brightness adjustment item 220, the contrast adjustment item 230, and the saturation adjustment item 240 by operating the input unit 105 and then presses down the "OK" button 290.

In addition, in a case where the color balance is adjusted, the user selects an item (tab) 202 positioned on the image quality adjustment screen 200 by operating the input unit 105, then designates a specific color in the color designation item 310 positioned on the image quality adjustment screen 300, which is shown in FIG. 4, displayed in the display unit 104, sets a desired value to the color balance adjustment item 320, and then presses down the "OK" button 370.

In a case where the image quality is adjusted for the image quality adjustment screen 200 or the image quality adjustment screen 300 as described above, execution of the image quality adjustment and the result of the image quality adjustment (values of each element of the brightness, the contrast, the saturation, and the color balance after adjustment) are transmitted to the image processing unit 100 through the display control unit 103.

In the image processing unit 100, the image quality adjustment direction receiving section 140 determines whether there is a user's direction for the execution of image quality adjustment within a predetermined time depending on whether the image quality adjustment is received (Step S105).

In Step S105, in a case where it is determined that there is no user's direction for the execution of image quality adjustment within the predetermined time, this process is completed.

In a case where the image quality adjustment direction receiving section 140 determines that there is a direction for the execution of image quality adjustment by receiving the execution of the image quality adjustment in Step S105, the image quality adjustment direction receiving section 140 receives the result of the above-described image quality adjustment, that is, a value of a factor after adjustment of which the image quality is adjusted out of factors of the brightness, the contrast, the saturation, and the color balance (Step S106).

The histogram changing section 150 changes the histogram for the image of a color, of which the image quality has been changed, out of the histograms for the images of each color that are generated by the histogram generating section 120 based on the result of the image quality adjustment received by the image quality adjustment direction receiving section 140 (Step S107).

The image density calculating section 130 calculates (recalculates) the image density of the image of the corresponding color based on the histogram after changes that have been made by the histogram changing section 150 (Step S108).

Thereafter, the image processing unit 100 performs a display process relating to the calculated image density through the display control unit 103 (Step S109).

In this display process, at least one of the following processes of (1) to (3) is performed.

(1) The image processing unit 100 transmits the image density that has been recalculated by the image density calculating section 130 in Step S108 to the display control unit 103.

The display control unit 103 displays the image density transmitted from the image processing unit 100 in the display area 250 of the image quality adjustment screen 200 displayed in the display unit 104 or the display area 330 of the image quality adjustment screen 300.

(2) The image processing unit 100 reads out the image density of an initial image corresponding to the color, of which the image quality has been changed, as the image density of the initial image relating to the input image from the lowest image density holding unit 101, calculates a difference between the read-out image density and the image density recalculated by the image density calculating section 130 in Step S108, and transmits the value of the acquired difference to the display control unit 103.

The display control unit 103 displays the value of the difference that is transmitted from the image processing unit 100 in the display area 260 of the image quality adjustment screen 200 displayed in the display unit 104 or the display area 340 of the image quality adjustment screen 300.

(3) In a case where the value of the image density that is calculated in Step S108 is smaller than the value of the image density (the lowest image density) stored in the lowest image density holding unit 101, the image processing unit 100 updates the value of the lowest image density that is stored in the lowest image density holding unit 101 based on the value of the image density calculated in Step S108. In such a case, the image density of the initial image relating to the input image and the lowest image density are stored for each of CMYK colors in the lowest image density holding unit 101.

In a case where the value of the lowest image density stored in the lowest image density holding unit 101 is updated based on the value of the image density calculated in Step S108, the image processing unit 100 updates the holding content of the image quality adjustment value holding unit 102 based on the result of the image quality adjustment at the time of the calculated image density (the image density having the latest lowest value). In addition, in the image quality adjustment value holding unit 102, the results of the image quality adjustment for each of the CMYK colors corresponding to the lowest image density corresponding to each of the CMYK colors are stored.

In addition, the image processing unit 100 notifies the display control unit 103 of the update of the holding contents of the lowest image density holding unit 101 and the image quality adjustment value holding unit 102.

The display control unit 103 that has received the notification of the update of the holding contents from the image processing unit 100 reads out the lowest image density from the lowest image density holding unit 101, and displays the read-out lowest image density in the display area 270 of the image quality adjustment screen 200 that is displayed in the display unit 104 or the display area 350 of the image quality adjustment screen 300. In addition, the display control unit 103 reads out the result of the image quality adjustment from the image quality adjustment value holding unit 102 and displays the read-out result of the image quality adjustment in the display areas 281 to 283 of the image quality adjustment screen 200 or the display area 360 of the image quality adjustment screen 300.

Next, the image density calculating process of the image processing apparatus 10 will be described with reference to a concrete example.

First, a process of calculating the image density of an initial image relating to an input image to be processed, that is, the image density of an image at a time when the initially set value is set in correspondence with factors determining the image quality will be described.

Figure 6:
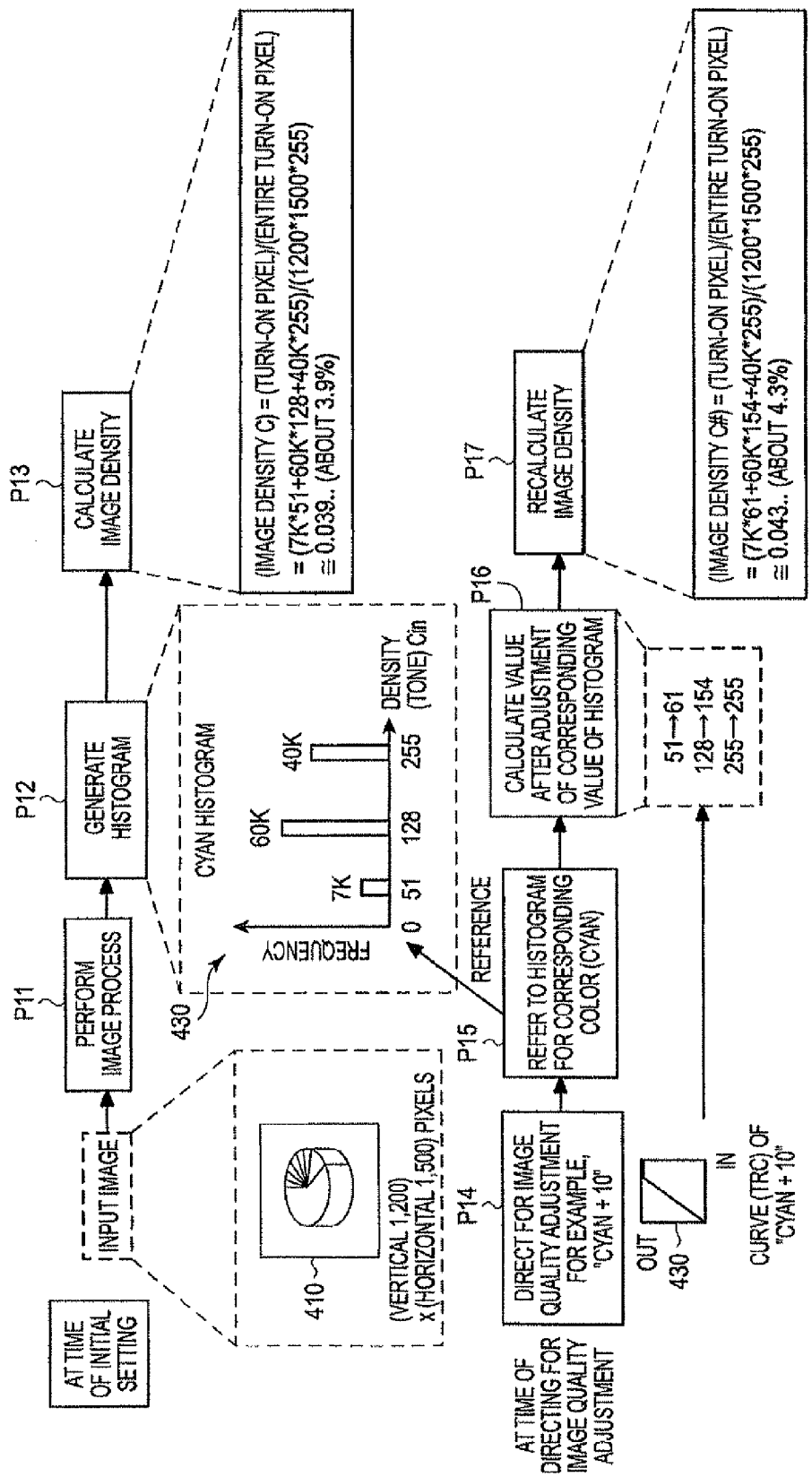
FIG. 6 is a diagram illustrating a detailed example of an image density calculating process of an image processing apparatus according to the first exemplary embodiment.

It is assumed that the input image (input image data having a defined image size) 410 to be processed, which is stored in the memory unit 106, has an image size of vertical 1,200 pixels×horizontal 1,500 pixels, as shown in FIG. 6.

Figure 5:
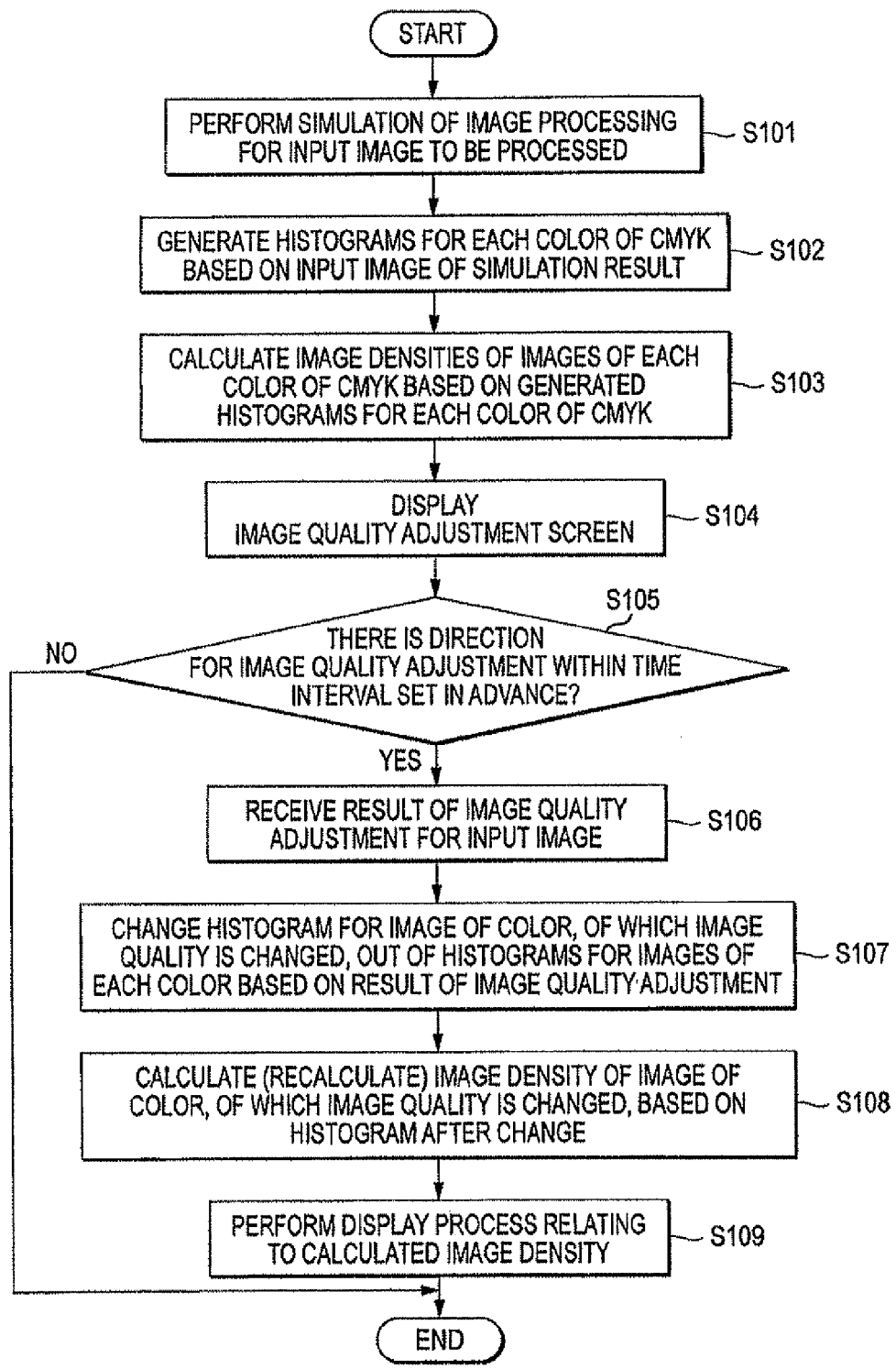
FIG. 5 is a flowchart representing the processing sequence of an image density calculating process of an image processing apparatus according to the first exemplary embodiment.

In the image processing unit 100, the processing section 110 reads out the input image data 410 to be processed from the memory unit 106 and performs simulation of image processing for the read-out input image data 410 (P11, see Step S101 shown in FIG. 5).

In P11, the tone correction processing part 112 of the processing section 110 performs a tone correction process for the image data of each of the CMYK colors that is output from the color conversion processing part 111 of the processing section 110 based on the default tone reproduction curve (TRC) for each color.

For example, the tone correction processing part 112 performs a tone correction process for the image data of cyan that is output from the color conversion processing part 111 of the processing section 110 based on a default tone reproduction curve (TRC) for cyan in which, for the image data of cyan, a first output tone value (density value) corresponding to a first input tone value (density value) is "51", a second output tone value corresponding to a second input tone value is "128", and a third output tone value corresponding to a third input tone value is "255" in a case where the range of tone values is 0 to 255.

Next, the histogram generating section 120 generates histograms for images of each of the CMYK colors of the initial image based on the input image data (image data of CMYK) that is the result of simulation performed by the processing section 110 (P12, see Step S102 shown in FIG. 5).

Here, the generated histogram for the image of cyan is a histogram 420 shown in FIG. 6. In FIG. 6, the vertical axis represents the frequency value (the number of images), and the horizontal axis represents the density Cin of an image, that is, the number Cin (the number of tones of 0 to 255) of tones. In addition, "K" that is included in "7K", "60K", and "40K" represents "1000". Thus, "7K", "60K", and "40K" represent 7×1000, 60×1000, and 40×1000, respectively.

In the histogram 420, the frequency value is 7×1000 at the tone value of 51, the frequency value is 60×1000 at the tone value of 128, and the frequency value is 40×1000 at the tone value of 255.

In the example represented in FIG. 6, the histogram for a cyan image is shown. However, histograms are also generated for images of each color of magenta, yellow, and black. Then, the generated histograms for each of the CMYK colors are stored in the memory unit 106.

The image density calculating section 130 calculates the image densities of images of each of the CMYK colors based on the histograms for images of each of the CMYK colors that are generated as described above (P13, see Step S103 shown in FIG. 5).

Here, the calculated image density C of the cyan image is acquired by calculating "turned-on pixel/entire turned-on pixel" for the input image of cyan as described above. In other words, the image density C is acquired as follows.

Image Density $C=\{(7\times1000\times51)+(60\times1000\times128)+(40\times1000\times255)\}/(1200\times1500\times255)\approx0.039$ (about 3.9%)

Next, a process of calculating the image density of an input image after image quality adjustment for a case where a direction for adjusting the image quality of the input image to be processed is made will be described.

In the state in which the image quality adjustment screen 200 shown in FIG. 3 is displayed in the display unit 104 by the image processing unit 100 that has calculated the image density in the above-described P13, it is assumed that the user selects an item (tab) 202 of the image quality adjustment screen 200 by operating the input unit 105, then designates, for example, cyan as the specific color for the color designation item 310 of the image quality adjustment screen 300, which is shown in FIG. 4, displayed in the display unit 104, sets a desired value, for example, "+10" to the color balance adjustment item 320, and then performs a direction for image quality adjustment by pressing the "OK" button 370.

The execution of image quality adjustment (adjustment of color balance) and the result of the image quality adjustment (to increase the color balance value of cyan by "+10") are transmitted from the display control unit 103 to the image processing unit 100. Accordingly, the image quality adjustment direction receiving section 140 receives the execution of image quality adjustment (to adjust the color balance) and the result of the image quality adjustment (to increase the color balance value of cyan by "+10") (P14, see Step S106 shown in FIG. 5) and transmits the result (to increase the color balance value of cyan by "+10") of the image quality adjustment as a direction for image quality adjustment to the histogram changing section 150.

In a case where the color balance value of cyan is to be increased by "+10", a new tone reproduction curve (TRC) for cyan as below is generated by the processing section 110, the histogram changing section 150, or the image processing unit 100 based on the default tone reproduction curve (TRC) for cyan.

The new tone reproduction curve (TRC) for cyan, for example, is a tone reproduction curve in which, the first output tone value corresponding to the first input tone value is "61", the second output tone value corresponding to the second input tone value is "154", and the third output tone value corresponding to the third input tone value is "255".

The histogram changing section 150 that has received the result of the image quality adjustment (to increase the color balance value of cyan by "+10") changes the histogram 420 based on the output tone value on the new tone reproduction curve (TRC) for cyan, which is generated in accordance with the result of the image quality adjustment, corresponding to the input tone value by referring to a histogram for a color, of which the image quality has been adjusted, that is, the histogram 420 for cyan in this example, out of histograms for images of each color that are generated by the histogram generating section 120 based on the result of the image quality adjustment (P15) (P16, see Step S107 shown in FIG. 5).

In particular, the histogram changing section 150 changes the histogram 420 such that the tone value of "51" is changed to a tone value of "61", and the tone value of "128" is changed to a tone value of "154". The tone value of "255" is stored to be the same without being changed.

Then, the image density calculating section 130 calculates (recalculates) the image density of an image of a corresponding color, that is, a cyan image in this example based on the histogram changed by the histogram changing section 150 (P17, see Step S108 shown in FIG. 5).

Here, the image density C# of the cyan image calculated (recalculated) in P17 is acquired as follow.

Image Density $C\#=\{(7\times1000\times61)+(60\times1000\times154)+(40\times1000\times255)\}/(1200\times1500\times255)\approx0.0043$ (about 4.3%)

As described above, according to the first exemplary embodiment, the image processing unit 100 calculates (recalculates) the image density by using the histogram for an image of a color, of which the image quality has been adjusted, without performing simulation of the image processing for calculating the image density in a case where the image quality adjustment is performed for the input image. In such a case, a histogram after image quality adjustment is generated by reading and changing the tone value of the histogram generated before the image quality adjustment.

Accordingly, the processing speed of a process of calculating the image density after the image quality adjustment is raised by an amount corresponding to no performance of simulation of the image processing and an amount corresponding to generation of the histogram after the image quality adjustment not on the basis of the input image after the image quality adjustment.

In addition, the image processing unit 100 displays the image density after the image quality adjustment in the display unit 104 in real time. Then, the user checks a change in the amount of toner consumption at the time of the image quality adjustment by referring to the image density after the image quality adjustment displayed in the display unit 104 and performs image quality adjustment in consideration of the amount of toner consumption.

Next, the hardware configuration of the image processing apparatus 10 will be described with reference to FIG. 7.

Figure 7:
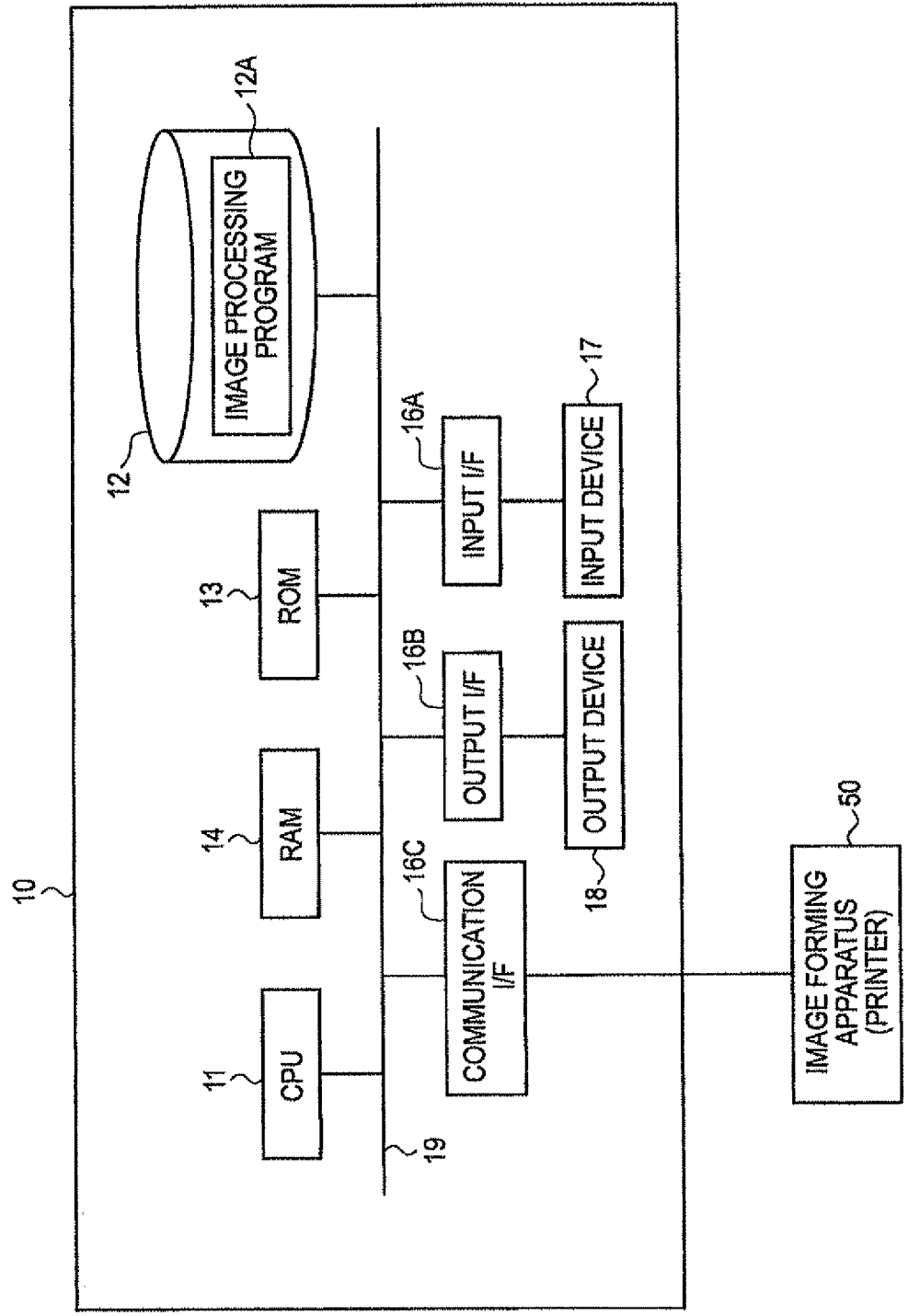
FIG. 7 is a configuration diagram representing a hardware configuration of an image processing apparatus according to the first exemplary embodiment.

The image processing apparatus 10, as shown in FIG. 7, includes a CPU 11, a memory device 12, a ROM 13, a RAM 14, an ASIC 15, an input I/F 16A, an output I/F 16B, a communication I/F 16C, an input device 17 connected to the input I/F 16A, and an output device 18 connected to the output I/F 16B. The constituent elements 11 to 15 and 16A to 16C are connected to a system bus 19.

The memory device 12, for example, is a hard disk. The memory device 12 stores various installed programs such as software (program) used for implementing the function of the image processing unit 100 (constituent elements 110 to 150) shown in FIG. 1, software (program) corresponding to the processing sequence of the image density calculating process shown in FIG. 5, and an image processing program 12A In addition, the memory device 12 implements the function of the memory unit 106 shown in FIG. 1 and stores input image data to be processed therein.

The image processing program 12A includes software (program) used for implementing the functions of the processing section 110, the histogram generating section 120, the image density calculating section 130, the image quality adjustment direction receiving section 140, and the histogram changing section 150 of the image processing unit 100 shown in FIG. 1. In the image processing unit 100, the histogram generating section 120 performs a generation process, the image density calculating section 130 performs a first calculation process and a second calculation process, the image quality adjustment direction receiving section 140 performs a reception process, and the histogram changing section 150 performs a changing process.

The ROM 13 is a read-only memory. The ROM 13 stores a multi-dimensional lookup table (LUT) needed for a color conversion process, a default tone reproduction curve (TRC) needed for a tone correction process, communication protocol information used for communication with an external device, and the like.

The RAM 14 is a temporary read/write memory. The RAM 14 stores programs including the image processing program 12A read from the memory device 12, input image data, a multi-dimensional LUT read from the ROM 13, a default TRC, and communication protocol information therein.

In addition, the RAM 14 has the function of the memory unit 106. The RAM 14 stores the result of image quality adjustment that is received by the image quality adjustment direction receiving section 140, histograms for each color generated by the histogram generating section 120, the image density calculated by the image density calculating section 130, histograms changed by the histogram changing section 150, and the like.

In addition, the RAM 14 achieves the functions of the lowest image density holding unit 101 and the image quality adjustment value holding unit 102 that are shown in FIG. 1.

The ASIC 15 is an application specific IC (integrated circuit) and achieves the function of the display control unit 103 shown in FIG. 1.

The input I/F (input interface) 16A and the output I/F (output interface) 16B respectively include a CPU (central processing unit) that performs data communication. The input I/F 16A performs data communication with the input device 17, and the output I/F 16B performs data communication with the output device 18. The input device 17 achieves the function of the input unit 105 shown in FIG. 1, and the output device 18 achieves the function of the display unit 104 shown in FIG. 1.

The communication I/F (communication interface) 16C includes a CPU (central processing unit) performing data communication and achieves the function of the communication unit 107 shown in FIG. 1. The communication I/F 16C performs data communication with the image forming apparatus 50 by reading the communication protocol information from the ROM 13 into the RAM 14 and performing the communication protocol information.

The CPU 11 is a central processing unit and implements the functions of the processing section 110, the histogram generating section 120, the image density calculating section 130, the image quality adjustment direction receiving section 140, and the histogram changing section 150 of the above-described image processing apparatus 10 by reading programs including the image processing program 12A from the memory device 12 into the RAM 14 and executing the programs and implements the processing function corresponding to the image processing program 12A. In addition, the CPU 11 controls the overall operation of the image processing apparatus 10.

Second Exemplary Embodiment

Next, an image processing apparatus according to a second exemplary embodiment will be described.

Figure 8:
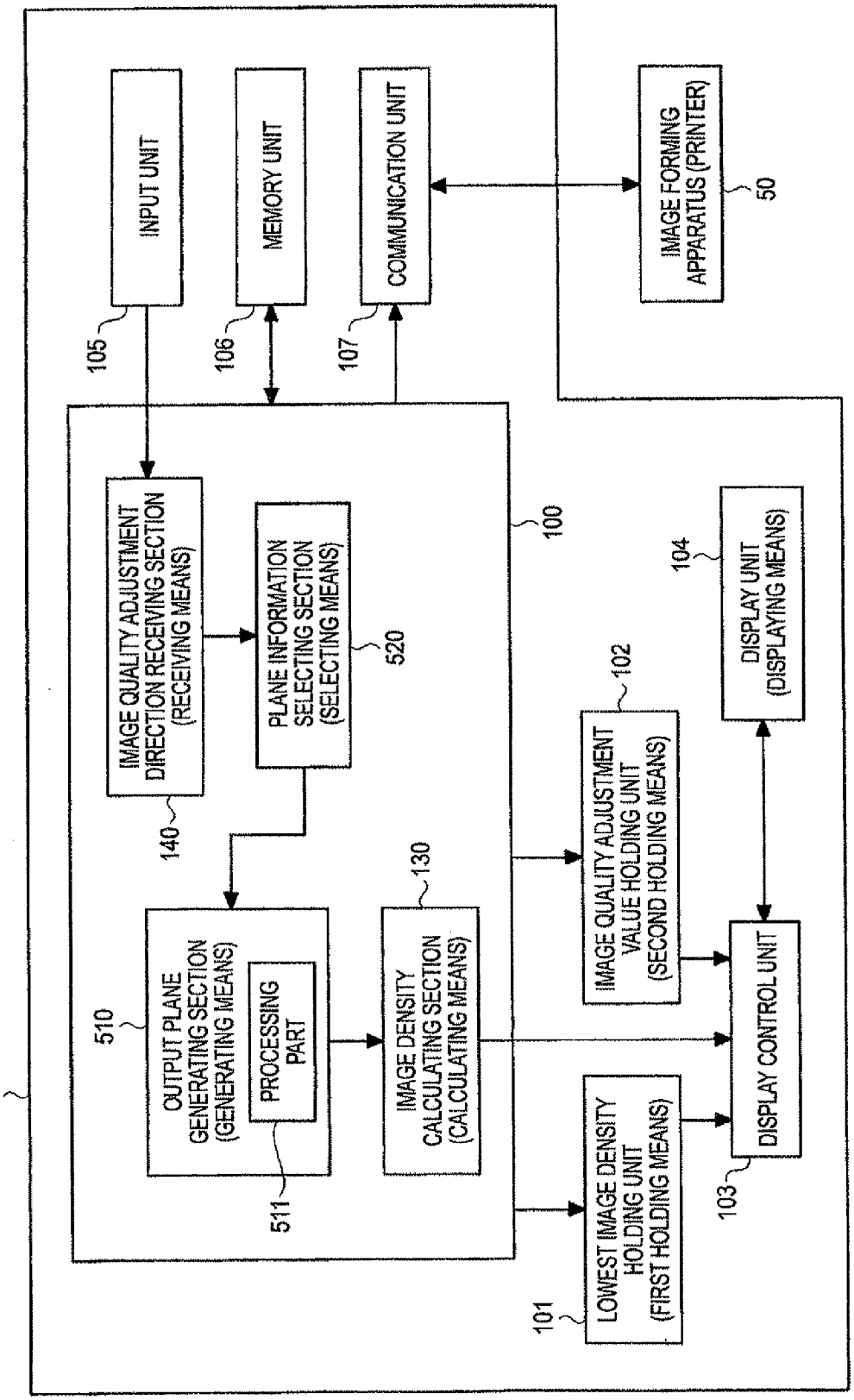
FIG. 8 is a block diagram representing the function of an image processing apparatus according to a second exemplary embodiment.

The image processing apparatus 20 according to the second exemplary embodiment has a configuration shown in FIG. 8. The image processing apparatus 20 has a configuration acquired by eliminating the processing section 110, the histogram generating section 120, and the histogram changing section 150 of the image processing apparatus 10 according to the first exemplary embodiment shown in FIG. 1 and adding an output plane generating section 510 and a plane information selecting section 520 thereto. In FIG. 8, to each part achieving a same function as that of the constituent element shown in FIG. 1, a same reference sign is assigned.

The output plane generating section 510 has a processing part 511. The processing part 511 has the same configuration as the processing section 110 according to the first exemplary embodiment shown in FIG. 2 and performs simulation of image processing such as a color conversion process, a tone correction process, a multi-value screen process, and a PWM process for an input image.

In addition, the output plane generating section 510 has the function of generating means and generates output plane information for each color based on color image data (CMYK image data) as the result of simulation of the image processing that is performed by the processing part 511.

In the second exemplary embodiment, the output plane information for each color includes information representing ON (a case where a pixel is not white) or OFF (a case where a pixel is white) for each pixel and information that represents the tone value of the pixel in correspondence with the pixel of the information representing ON.

In addition, based on the result of the image quality adjustment that is received by the image quality adjustment direction receiving section 140 and the output plane information of a color selected by the plane information selecting section 520, the output plane generating section 510 generates new output plane information of the color.

The plane information selecting section 520 has the function of selecting means. The plane information selecting section 520 selects the output plane information of a color, of which the image quality has been changed, out of the output plane information for each color that is generated by the output plane generating section 510 based on the result of the image quality adjustment that is received by the image quality adjustment direction receiving section 140.

In the second exemplary embodiment, the image density calculating section 130 calculates the image density of an image of each color based on the output plane information of each color that is generated by the output plane generating section 510.

In addition, the image density calculating section 130 calculates (recalculates) the image density of the image of the color, of which the image quality has been adjusted, based on the new output plane information generated by the output plane generating section 510.

In the second exemplary embodiment, similarly to the above-described first exemplary embodiment, the image quality adjustment screen 200 shown in FIG. 3 or the image quality adjustment screen 300 shown in FIG. 4 is displayed in the display unit 104.

Next, an image density calculating process of the image processing apparatus 20 will be described with reference to FIG. 9.

In a case where the image density of an image (input image) to be processed is desired to be calculated, a user designates a marker (for example, a file name or the like) representing an input image (an input image of a defined image size) to be processed and inputs calculation of the image density of the input image by operating the input unit 105. The input information input by the user is transmitted to the image processing unit 100 from the input unit 105.

In the image processing unit 100, the processing part 511 of the output plane generating section 510 reads out the input image data (RGB image data of a defined image size) that is designated to be processed from the memory unit 106 and performs simulation of the image processing for the read-out input image (Step S201). The result of this simulation is the CMYK image data.

The output plane generating section 510 generates output plane information of images of each of CMYK colors of the initial image based on the input image data (CMYK image data) that is the result of simulation performed by the processing part 511 (Step S202).

Here, the output plane information for each color includes information representing ON (a case where a pixel is not white) or OFF (a case where a pixel is white) for each pixel and information that represents the tone value of the pixel in correspondence with the pixel of the information representing ON.

The image density calculating section 130 calculates the image density of an image of each of CMYK colors based on the output plane information for the images of each of the CMYK colors generated as described above (Step S303).

In a case where the image density is calculated by the image density calculating section 130 as described above, the image processing unit 100 stores the calculated image density (the lowest image density at the current time point, and the image density of the initial image for the input image) in the lowest image density holding unit 101 and stores the result (a value corresponding to the initially set value at the current time point) of the image quality adjustment at the time of the image density in the image quality adjustment value holding unit 102. In addition, the image density is an image density for each of the CMYK colors, and the result of the image quality adjustment is a result of image quality adjustment for each of the CMYK colors.

The image processing unit 100 that has calculated the image density as described above displays the image quality adjustment screen 200 shown in FIG. 3 in the display unit 104 through the display control unit 103 (Step S204).

Then, for example, in a case where at least one element of the brightness, the contrast, and the saturation is adjusted with reference to a reduced input image 210 displayed on the image quality adjustment screen 200, the user sets a desired value by moving a slide bar of the adjustment item corresponding to the element to be adjusted out of the brightness adjustment item 220, the contrast adjustment item 230, and the saturation adjustment item 240 by operating the input unit 105 and then presses down the "OK" button 290.

In addition, in a case where the color balance is adjusted, the user selects an item (tab) 202 positioned on the image quality adjustment screen 200 by operating the input unit 105, then designates a specific color in the color designation item 310 positioned on the image quality adjustment screen 300, which is shown in FIG. 4, displayed in the display unit 104, sets a desired value to the color balance adjustment item 320, and then presses down the "OK" button 370.

In a case where the image quality is adjusted for the image quality adjustment screen 200 or the image quality adjustment screen 300 as described above, the execution of image quality adjustment and the result of the image quality adjustment (values of each element of the brightness, the contrast, the saturation, and the color balance after adjustment) are transmitted to the image processing unit 100 through the display control unit 103.

In the image processing unit 100, the image quality adjustment direction receiving section 140 determines whether there is a user's direction for the execution of image quality adjustment within a predetermined time depending on whether the execution of image quality adjustment is received (Step S205).

In Step S205, in a case where it is determined that there is no user's direction for the execution of image quality adjustment within the predetermined time, this process is completed.

In a case where the image quality adjustment direction receiving section 140 determines that there is a direction for the execution of image quality adjustment by receiving the execution of image quality adjustment in Step S205, the image quality adjustment direction receiving section 140 receives the result of the above-described image quality adjustment, that is, the value of a factor after adjustment, of which the image quality is adjusted, out of factors of the brightness, the contrast, the saturation, and the color balance (Step S206).

Next, the plane information selecting section 520 selects the output plane information of an image of a color, of which the image quality has been adjusted, out of the output plane information of the images of each color that is generated by the output plane generating section 510 based on the result of the image quality adjustment that is received by the image quality adjustment direction receiving section 140 (Step S207).

The output plane generating section 510, based on the result of the above-described image quality adjustment and the output plane information of the color selected by the plane information selecting section 520, generates new output plane information of the color (Step S208).

The image density calculating section 130 calculates (recalculates) the image density of an image of the color, of which the image quality has been adjusted, based on the new output plane information generated by the output plane generating section 510 (Step S209).

Thereafter, the image processing unit 100 performs a display process relating to the calculated image density through the display control unit 103 (Step S210).

In the display process according to the second exemplary embodiment, at least one of the processes of (1) to (3) of the above-described first exemplary embodiment is performed.

Next, the image density calculating process of the image processing apparatus 20 will be described with reference to a concrete example.

First, a process of calculating the image density of an initial image relating to an input image to be processed, that is, the image density of an image at a time when the initially set value is set in correspondence with factors determining the image quality will be described.

Figure 10:
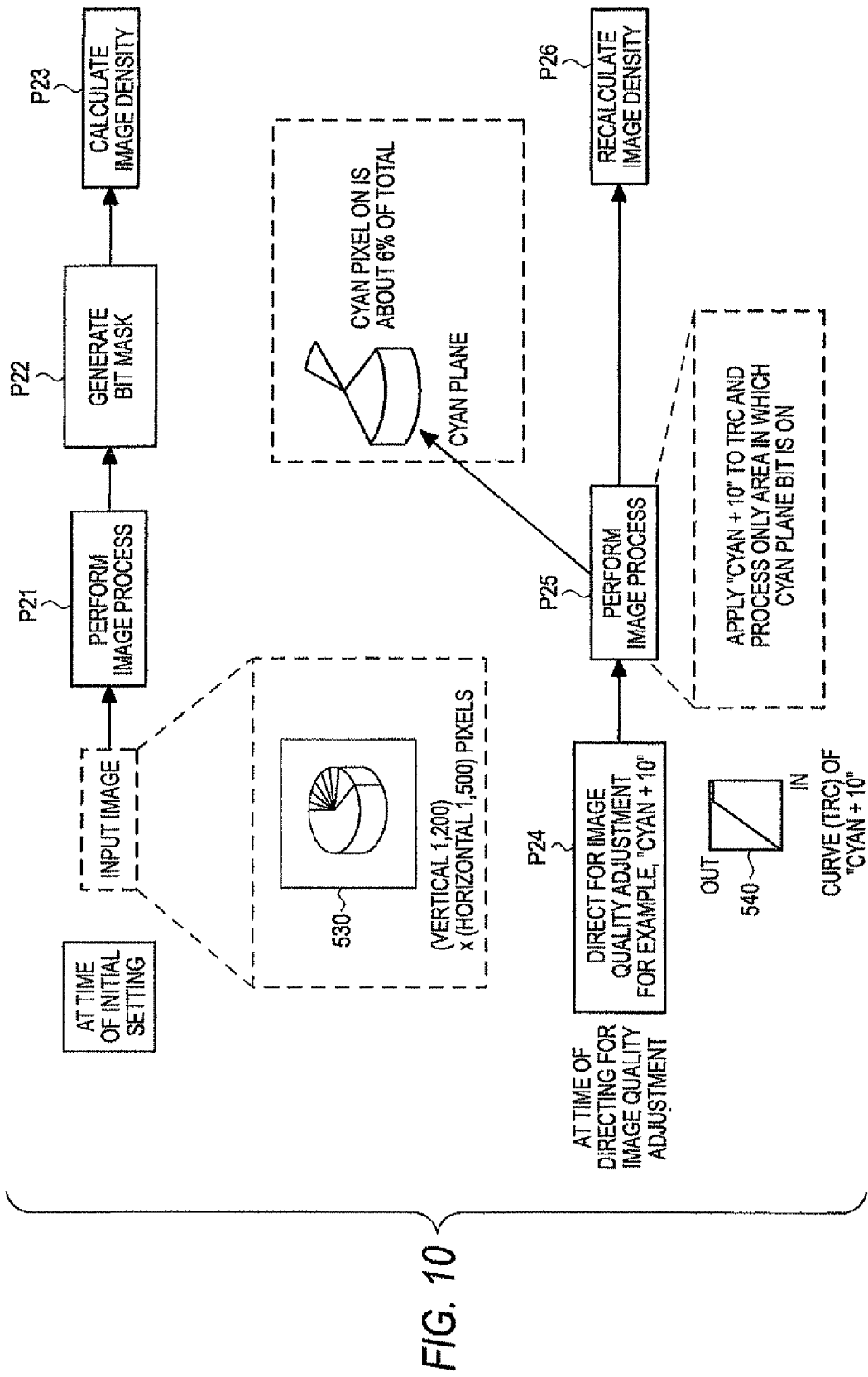
FIG. 10 is a diagram illustrating a detailed example of an image density calculating process of an image processing apparatus according to the second exemplary embodiment.

It is assumed that the input image (input image data having a defined image size) 530 to be processed, which is stored in the memory unit 106, has an image size of vertical 1,200 pixels×horizontal 1,500 pixels, as shown in FIG. 10.

Figure 9:
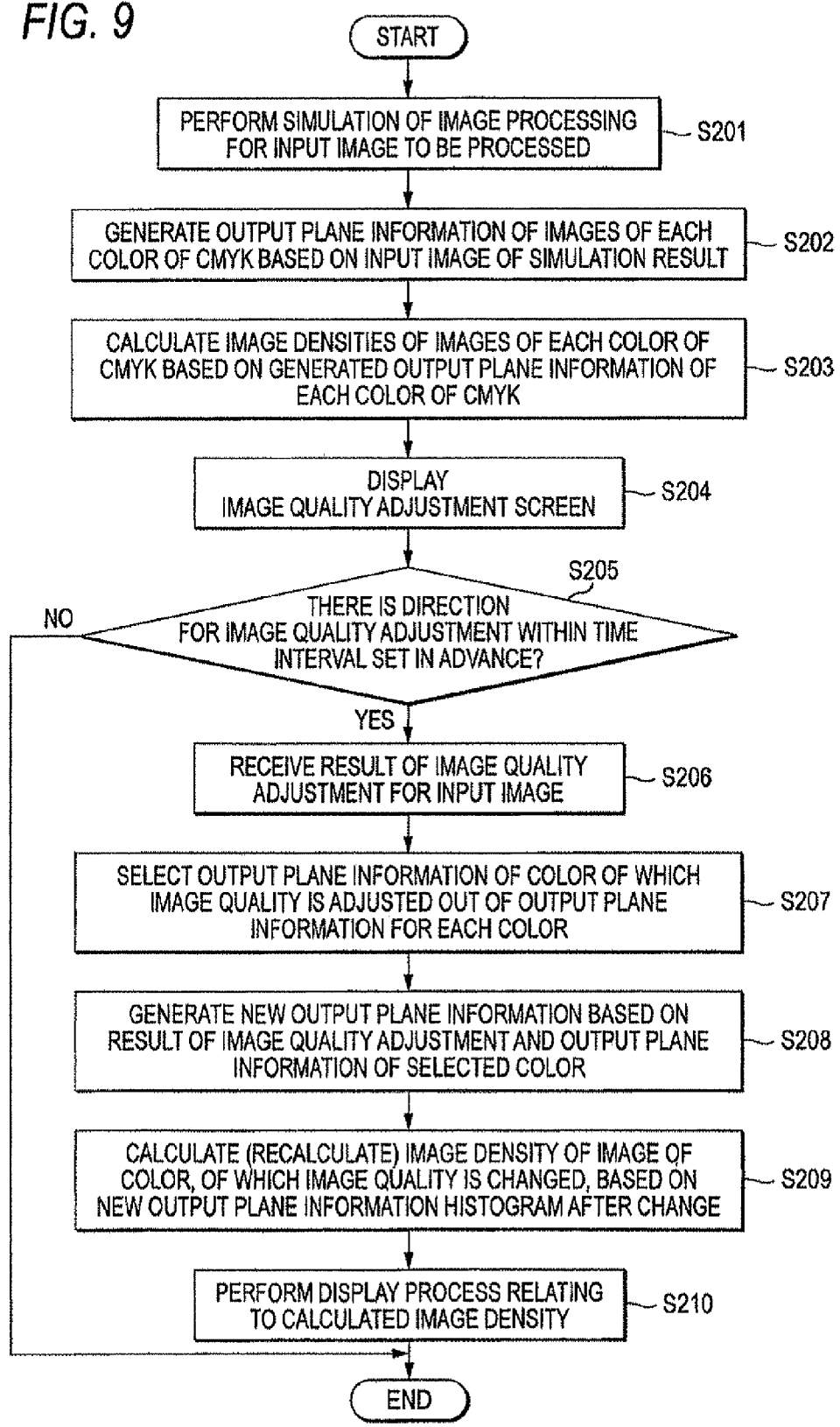
FIG. 9 is a flowchart representing the processing sequence of an image density calculating process of an image processing apparatus according to the second exemplary embodiment.

In the image processing unit 100, the processing part 511 of the histogram generating section 510 reads out the input image data 530 to be processed from the memory unit 106 and performs simulation of image processing for the read-out input image data 530 (P21, see Step S201 shown in FIG. 9).

In P21, the tone correction processing part of the processing part 511 performs a tone correction process for the image data for each of the CMYK colors that is output from the color conversion processing part of the processing part 511 based on the default tone reproduction curve (TRC) for each color.

Figure 11A:
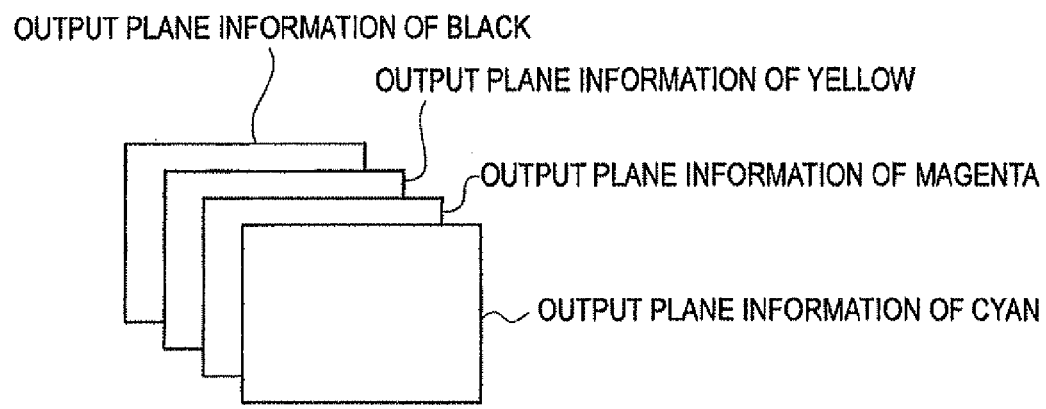
FIGS. 11A and 11B are diagrams illustrating output plane information of an image processing apparatus according to the second exemplary embodiment.

Next, the output plane generating section 510 generates output plane information for each of the CMYK colors of the initial image, that is, a bit mask as shown in FIG. 11A based on the input image data (CMYK image data) that is the result of the simulation performed by the processing part 511 (P22, see Step S202 shown in FIG. 9).

The bit information and the tone information of the output plane information (bit mask) for each of the CMYK colors that is generated as described above are stored in the memory unit 106.

The image density calculating section 130 calculates the image densities of images of each of the CMYK colors based on the output plane information (bit mask) of each of the CMYK colors that is generated as described above (P23, see Step S203 shown in FIG. 9).

In such a case, similarly to the first exemplary embodiment, the image density of an image of each color is acquired by calculating "turned-on pixel/entire turned-on pixel".

Next, a process of calculating the image density of an input image after image quality adjustment for a case where a direction for adjusting the image quality of the input image to be processed is made will be described.

In the state in which the image quality adjustment screen 200 shown in FIG. 3 is displayed in the display unit 104 by the image processing unit 100 that has calculated the image density in the above-described P23, it is assumed that the user selects an item (tab) 202 of the image quality adjustment screen 200, then designates, for example, cyan as the specific color for the color designation item 310 of the image quality adjustment screen 300, which is shown in FIG. 4, displayed in the display unit 104, sets a desired value, for example, "+10" to the color balance adjustment item 320 by operating the input unit 105, and then performs a direction for image quality adjustment by pressing the "OK" button 370.

In a case where the color balance value of cyan is to be increased by "+10", a new tone reproduction curve (TRC) for cyan in which the output tone value corresponding to the input tone value is changed is generated by the processing part 511 or the image processing unit 100 based on the default tone reproduction curve (TRC) 540 for cyan.

The execution of image quality adjustment (adjustment of color balance) and the result of the image quality adjustment (to increase the color balance value of cyan by "+10") are transmitted from the display control unit 103 to the image processing unit 100. Accordingly, the image quality adjustment direction receiving section 140 receives the execution of image quality adjustment (to adjust the color balance) and the result of the image quality adjustment (to increase the color balance value of cyan by "+10") (P24, see Step S206 shown in FIG. 9) and transmits the result (to increase the color balance value of cyan by "+10") of the image quality adjustment as a direction for image quality adjustment to the plane information selecting section 520.

Next, the plane information selecting section 520 selects the output plane information (bit mask) of an image of a color, of which the image quality has been changed, out of the output plane information (bit masks) of images of each color that is generated by the output plane generating section 510, that is, the output plane information (bit mask) of an image of cyan in this example, based on the result of the image quality adjustment that is received by the image quality adjustment direction receiving section 140 and notifies the output plane generating section 510 that the output plane information of the color, of which the image quality has been changed, is the output plane information of cyan.

In the output plane generating section 510 that has received the above-described notification, the processing part 511 performs simulation of image processing including a tone correction process, a multi-value screen process, and a PWM process based on the output plane information (bit mask) of the color selected by the plane information selecting section 520, that is, the output plane information (bit mask) of cyan in this example and the new tone reproduction curve (TRC) 540 for cyan corresponding to the result of the above-described image quality adjustment (P25).

Figure 11B:
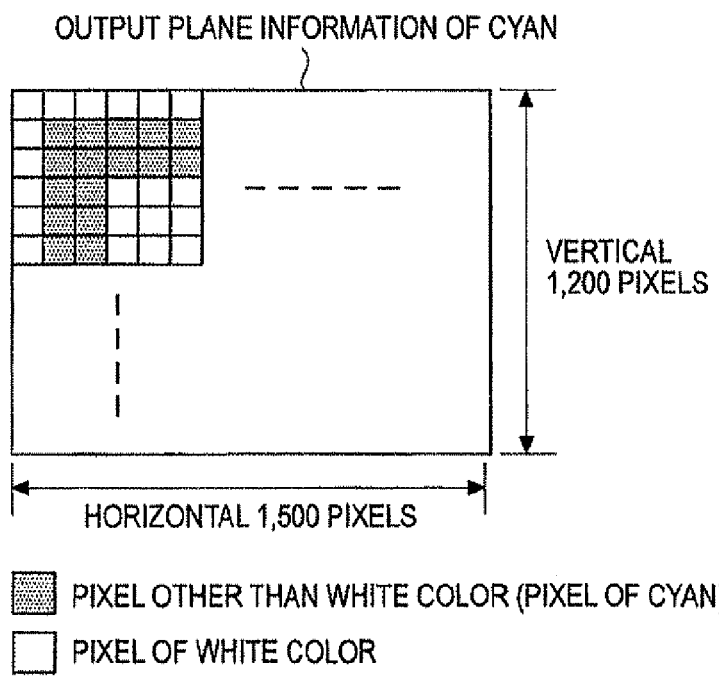

In P25, the processing part 511, as shown in FIG. 11B, performs simulation of image processing including a tone correction process, a multi-value screen process, and a PWM process based on the new tone reproduction curve (TRC) 540 for cyan only for pixels (pixels that are not white) for which information (ON bit) indicating ON, that is, a bit in the output plane information (bit mask) of cyan is turned on. In addition, in this simulation, it is assumed that the pixels having the ON bit of the output plane information (bit mask) of cyan are about 6% of all the pixels.

The output plane generating section 510 generates new output plane information (bit mask) of the corresponding color based on the result of the simulation performed by the processing part 511.

Then, the image density calculating section 130 calculates (recalculates) the image density of an image of the corresponding color based on the new output plane information (bit mask) generated by the output plane generating section 510 (P26, see Step S209 shown in FIG. 9).

In the second exemplary embodiment, the output plane generating section 510 generates the output plane information of each of the CMYK colors. However, the present invention is not limited thereto. Thus, the output plane generating section 510 may be configured to generate the output plane information of each of RGB colors.

In such a case, the processing part 511 of the output plane generating section 510 is set so as not to be operated. Then, the output plane generating section 510 generates the output plane information of each of the RGB colors based on the input image data of the RGB colors. In addition, for portions (pixels) other than R=G=B=255 (that is, white pixels), the image density calculating process is performed.

As described above, according to the second exemplary embodiment, in a case where image quality adjustment is performed for an input image, the image processing unit 100 do not perform simulation of image processing for a portion not relating to the image quality adjustment but performs simulation of image processing only for portions (pixels) in which the output plane information (bit mask) of the color, of which the image quality has been adjusted, is not white, that is, only for ON-bit pixel data for calculating the image density. In other words, the image processing unit 100 does not perform simulation of the image processing for a white portion (pixel) of the output plane information (bit masks) of the color, of which the image quality has been adjusted.

Accordingly, since the simulation of image processing is performed only for a portion (pixel) that is related to image quality adjustment and is not white (the simulation of image processing is not performed for a white portion), the processing speed of the process of calculating the image density after the image quality adjustment is increased.

The hardware configuration of the image processing apparatus 20 is the same as that of the image processing apparatus 10 according to the first exemplary embodiment shown in FIG. 7.

In addition, the memory device 12 stores various installed programs such as software (program) used for implementing the function of the image processing unit 100 (constituent elements 130, 140, 510, and 520) shown in FIG. 8, software (program) corresponding to the processing sequence of the image density calculating process shown in FIG. 9, and an image processing program 12A.

The image processing program 12A includes software (program) used for implementing the functions of the image density calculating section 130, the image quality adjustment direction receiving section 140, the output plane generating section 510 (including the processing part 511), and the plane information selecting section 520 of the image processing unit 100 shown in FIG. 8. In the image processing unit 100, the output plane generating section 510 performs a first generation process and a second generation process, the image density calculating section 130 performs a first calculation process and a second calculation process, the image quality adjustment direction receiving section 140 performs a reception process, and the plane information selecting section 520 performs a selection process.

Third Exemplary Embodiment

Next, an image processing apparatus according to a third exemplary embodiment will be described.

Figure 12:
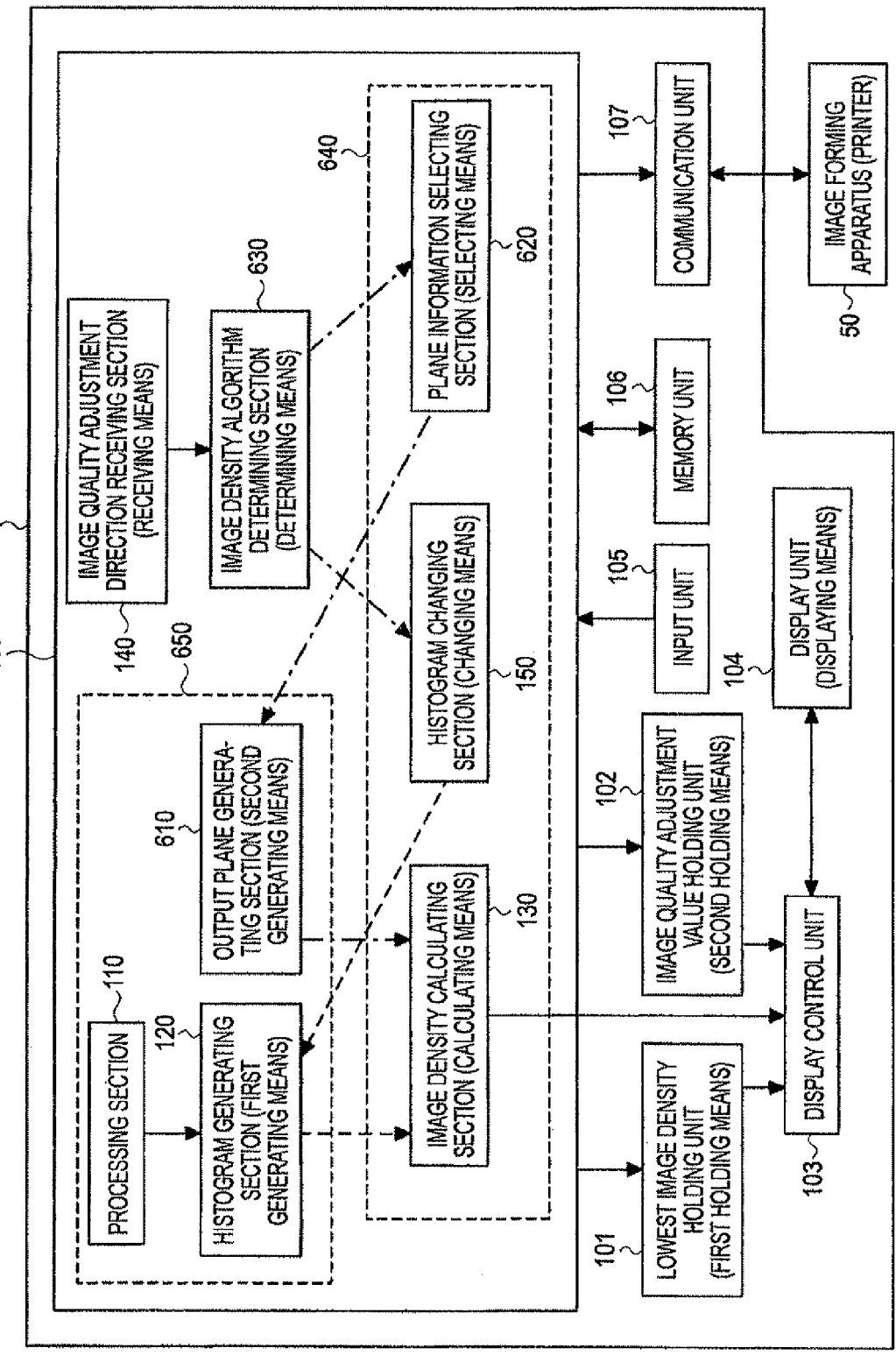
FIG. 12 is a block diagram representing the function of an image processing apparatus according to a third exemplary embodiment.

The image processing apparatus 30 according to the third exemplary embodiment has a configuration shown in FIG. 12. The image processing apparatus 30 has a configuration acquired by adding an output plane generating section 610, a plane information selecting section 620, and an image density algorithm determining section 630 to the image processing apparatus 10 according to the first exemplary embodiment shown in FIG. 1. In FIG. 12, to each part achieving a same function as that of the constituent element shown in FIG. 1, a same reference sign is assigned.

In the third exemplary embodiment, the histogram generating section 120 has the function of first generating means and generates histograms for each of CMYK colors.

The output plane generating section 610 has the function of second generating means and generates output plane information for each of RGB colors based on RGB input image data.

The plane information selecting section 620 has the same function as the plane information selecting section 520 shown in FIG. 8.

The image density algorithm determining section 630 has the function of determining means. The image density algorithm determining section 630 determines whether to use either a histogram generated by the histogram generating section 120 or the output plane information generated by the output plane generating section 610 based on the result of the image quality adjustment that is received by the image quality adjustment direction receiving section 140.

In addition, when determining to calculate the image density by using the histogram, the image density algorithm determining section 630 notifies the histogram changing section 150 of the use of the histogram and the result of image quality adjustment. On the other hand, when determining to calculate the image density by using the output plane information, the image density algorithm determining section 630 notifies the plane information selecting section 620 of the use of the output plane information and the result of image quality adjustment.

According to the third exemplary embodiment, the image density calculating section 130 calculates the image densities of images of each color based on either the histogram generated by the histogram generating section 120 or the output plane information generated by the output plane generating section 610.

In particular, in a case where image quality adjustment is not performed for an input image, the image density calculating section 130 generates the image density based on one predetermined type of information of the histogram and the output plane information, for example, the histogram. On the other hand, in a case where image quality adjustment is performed for the input image, the image density calculating section 130 generates the image density based on one type of information of the histogram and the output plane information, which is determined by the image density algorithm determining section 630.

In the third exemplary embodiment, the image density calculating section 130, the histogram changing section 150, and the plane information selecting section 620 configure an execution unit 640.

The execution unit 640 has the function of executing means. The execution unit 640 performs an image density calculating process for an image of a color, of which the image quality has been changed, based on one type of information of the histogram or the output plane information, which is determined by the image density algorithm determining section 630, and the result of the image quality adjustment.

In the third exemplary embodiment, the processing section 110 and the histogram generating section 120 that are used for generating histograms of each of the CMYK colors and the output plane generating section 610 used for generating the output plane of RGB colors are disposed. However, the present invention is not limited thereto. Thus, a generation unit 650 that has the functions of the processing section 110, the histogram generating section 120, and the output plane generating section 610 may be disposed.

Next, an image density calculating process of the image processing apparatus 30 will be described with reference to FIG. 13.

In this example, in a case where the image quality adjustment is not performed for the input image, the image density calculating section 130 is configured to generate the image density based on the histogram out of the histogram and the output plane information.

In a case where the image density of an image (input image) to be processed is desired to be calculated, a user designates a marker (for example, a file name or the like) representing an input image (an input image of a defined image size) to be processed and inputs calculation of the image density of the input image by operating the input unit 105. The input information input by the user is transmitted to the image processing unit 100 from the input unit 105.

Figure 15:
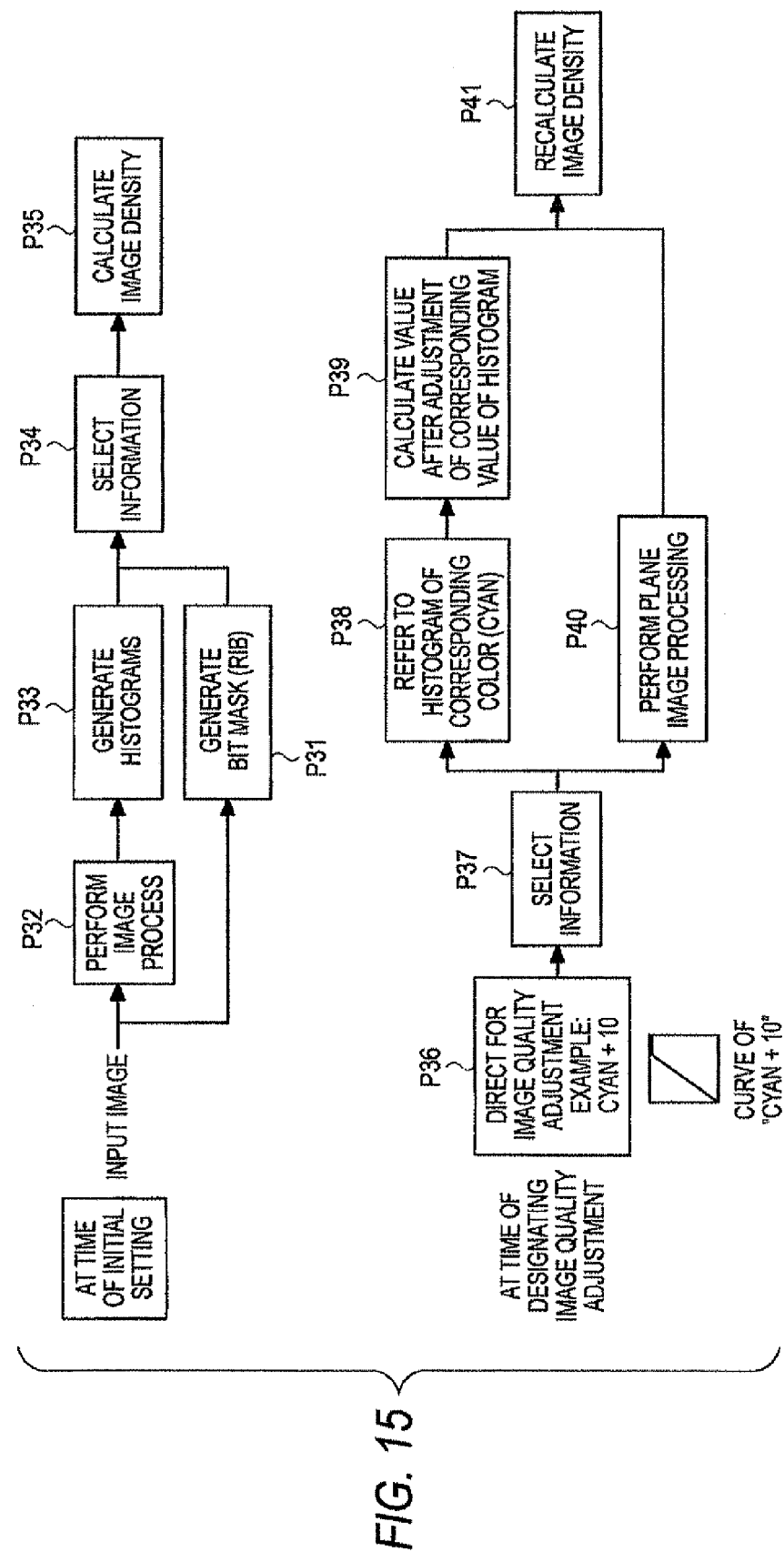
FIG. 15 is a diagram illustrating an image density calculating process of an image processing apparatus according to the third exemplary embodiment.

In the image processing unit 100, the output plane generating section 610 reads out the input image data (RGB image data of a defined image size) that is designated to be processed from the memory unit 106 and generates the output plane information (bit mask) of each of the RGB colors based on the read-out input image data (Step S301, see P31 shown in FIG. 15).

The processing section 110 reads out the input image data (RGB image data of a defined image size) designated to be processed from the memory unit 106 and performs simulation of image processing such as a color conversion process, a tone correction process, a multi-value screen process, and a PWM process for the read-out input image (Step S302, see P32 shown in FIG. 15).

The histogram generating section 120 generates histograms for images of each of the CMYK colors of the initial image based on the input image data (image data) that is the result of simulation performed by the processing section 110 (Step S303, see P33 shown in FIG. 15).

In addition, it may be configured that the output plane generating section 610 generates the output plane information of each of the RGB colors and then transmits the RGB image data read out from the memory unit 106 to the processing section 110, and the processing section 110 performs simulation of the above-described image processing for the received RGB image data.

The image density calculating section 130 selects one type of information, which is set in advance, of the histogram generated by the histogram generating section 120 and the output plane information generated by the output plane generating section 610, for example, the histograms for images of each of CMYK colors (see P34 shown in FIG. 15) and calculates the image densities of images of each of the CMYK colors based on the selected histograms for images of each of the CMYK colors (Step S304, see P35 shown in FIG. 15).

In a case where the image density is calculated by the image density calculating section 130 as described above, the image processing unit 100 stores the calculated image density (the lowest image density at the current time point, and the image density of the initial image for the input image) in the lowest image density holding unit 101 and stores the result (a value corresponding to the initially set value at the current time point) of the image quality adjustment at the time of the image density in the image quality adjustment value holding unit 102. In addition, the image density is an image density for each of the CMYK colors, and the result of the image quality adjustment is a result of image quality adjustment for each of the CMYK colors.

The image processing unit 100 that has calculated the image density as described above displays the image quality adjustment screen 200 shown in FIG. 3 in the display unit 104 through the display control unit 103 (Step S305).

Then, for example, in a case where at least one element of the brightness, the contrast, and the saturation is adjusted with reference to a reduced input image 210 displayed on the image quality adjustment screen 200, the user sets a desired value by moving a slide bar of the adjustment item corresponding to the element to be adjusted out of the brightness adjustment item 220, the contrast adjustment item 230, and the saturation adjustment item 240 by operating the input unit 105 and then presses down the "OK" button 290.

In addition, in a case where the color balance is adjusted, the user selects an item (tab) 202 positioned on the image quality adjustment screen 200 by operating the input unit 105, then designates a specific color in the color designation item 310 positioned on the image quality adjustment screen 300, which is shown in FIG. 4, displayed in the display unit 104, sets a desired value to the color balance adjustment item 320, and then presses down the "OK" button 370.

In a case where the image quality is adjusted for the image quality adjustment screen 200 or the image quality adjustment screen 300 as described above, the execution of image quality adjustment and the result of the image quality adjustment (values of each element of the brightness, the contrast, the saturation, and the color balance after adjustment) are transmitted to the image processing unit 100 through the display control unit 103.

In the image processing unit 100, the image quality adjustment direction receiving section 140 determines whether there is a user's direction for the execution of the image quality adjustment within a predetermined time depending on whether the image quality adjustment is received (Step S306).

In Step S306, in a case where it is determined that there is no user's direction for the execution of image quality adjustment within the predetermined time, this process is completed.

In a case where the image quality adjustment direction receiving section 140 determines that there is a direction for the execution of image quality adjustment by receiving the execution of image quality adjustment in Step S306, the image quality adjustment direction receiving section 140 receives the result of the above-described image quality adjustment, that is, the value of a factor after adjustment, of which the image quality is adjusted, out of factors of the brightness, the contrast, the saturation, and the color balance (Step S307, see P36 shown in FIG. 15).

The image density algorithm determining section 630 determines whether to use either the histogram generated by the histogram generating section 120 or the output plane information generated by the output plane generating section 610 based on the result of the image quality adjustment received by the image quality adjustment direction receiving section 140 (Step S308, see P37 shown in FIG. 15).

In the third exemplary embodiment, the histogram is employed for a case where the result of image quality adjustment is the result of image quality adjustment for CMYK colors, and the output plane information is employed for a case where the result of image quality adjustment is the result of image quality adjustment for RGB colors.

When determining to calculate the image density by using the histogram, the image density algorithm determining section 630 notifies the histogram changing section 150 of the use of the histogram and the result of image quality adjustment. On the other hand, when determining to calculate the image density by using the output plane information, the image density algorithm determining section 630 notifies the plane information selecting section 620 of the use of the output plane information and the result of image quality adjustment.

The execution unit 640 performs the process of calculating the image density of an image of a color, of which the image quality has been adjusted, based on one type of information of the histogram and the output plane information, which is determined by the image density algorithm determining section 630, and the result of the image quality adjustment (Step S309).

In other words, in Step S308 and Step S309, the following process is performed.

Figure 14:
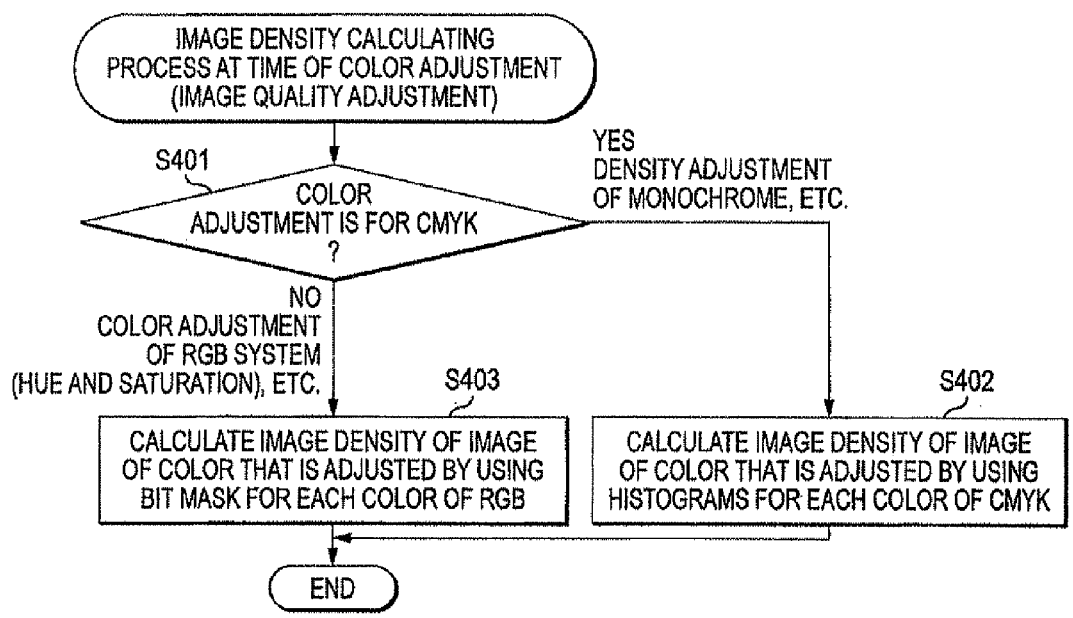
FIG. 14 is a flowchart showing the processing sequence of an image density calculating process (a case where image quality adjustment is color adjustment) of an image processing apparatus according to the third exemplary embodiment.

As shown in FIG. 14, the image density algorithm determining section 630 determines whether or not the result of the image quality adjustment is color adjustment of CMYK colors (Step S401).

In Step S401, in a case where the color adjustment (monochrome density adjustment or the like) of the CMYK colors is determined, the execution unit 640 (the image density calculating section 130 thereof) calculates the image density of the image of a color that has been adjusted by using the histograms for each of the CMYK colors.

On the other hand, in a case where the result of the image quality adjustment is determined not to be the color adjustment of the CMYK colors in Step S401, for example, in a case where the color adjustment of the hue or the saturation of the RGB system is determined, the execution unit 640 (the image density calculating section 130 thereof) calculates the image density of the image of a color that has been adjusted by using the output plane information (bit mask) of each of the RGB colors.

In addition, in Step S309, in a case where the image density is calculated by using the histogram, the same processes as Steps S107 and S108 of the image density calculating process according to the first exemplary embodiment shown in FIG. 5 are performed (see P38, P39, and P41 shown in FIG. 15). On the other hand, in a case where the image density is calculated by using the output plane information, the same processes as Steps S207 to S209 of the image density calculating process according to the second exemplary embodiment shown in FIG. 9 are performed (see P40 and P41 shown in FIG. 15).

When the image density is calculated as described above, the image processing unit 100 performs a display process relating to the calculated image density through the display control unit 103 (Step S310).

In the display process according to the third exemplary embodiment, at least one of the processes of (1) to (3) of the above-described first exemplary embodiment is performed.

In a case where the histograms of CMYK are not changed, a case of calculating the image density by using the histogram has a smaller calculation amount (data amount) than a case of calculating the image density by using the output plane information. Accordingly, in such a case, the histogram is used.

On the other hand, in a case where the histograms of CMYK are changed, the output plane information (bit masks) of RGB is used.

As described above, according to the third exemplary embodiment, the image processing unit 100 calculates (recalculates) the image density by using the histogram or the output plane information (bit mask) depending on whether the histograms of CMYK are changed in response to the result of the image quality adjustment in a case where the image quality adjustment is performed for the input image.

Accordingly, in a case where the histograms of the CMYK are not changed, a case of calculating (recalculating) the image density by using the histogram has a higher processing speed than a case of calculating (recalculating) the image density by using the output plane information (bit mask).

The hardware configuration of the image processing apparatus 30 is the same as that of the image processing apparatus 10 according to the first exemplary embodiment shown in FIG. 7.

Figure 13:
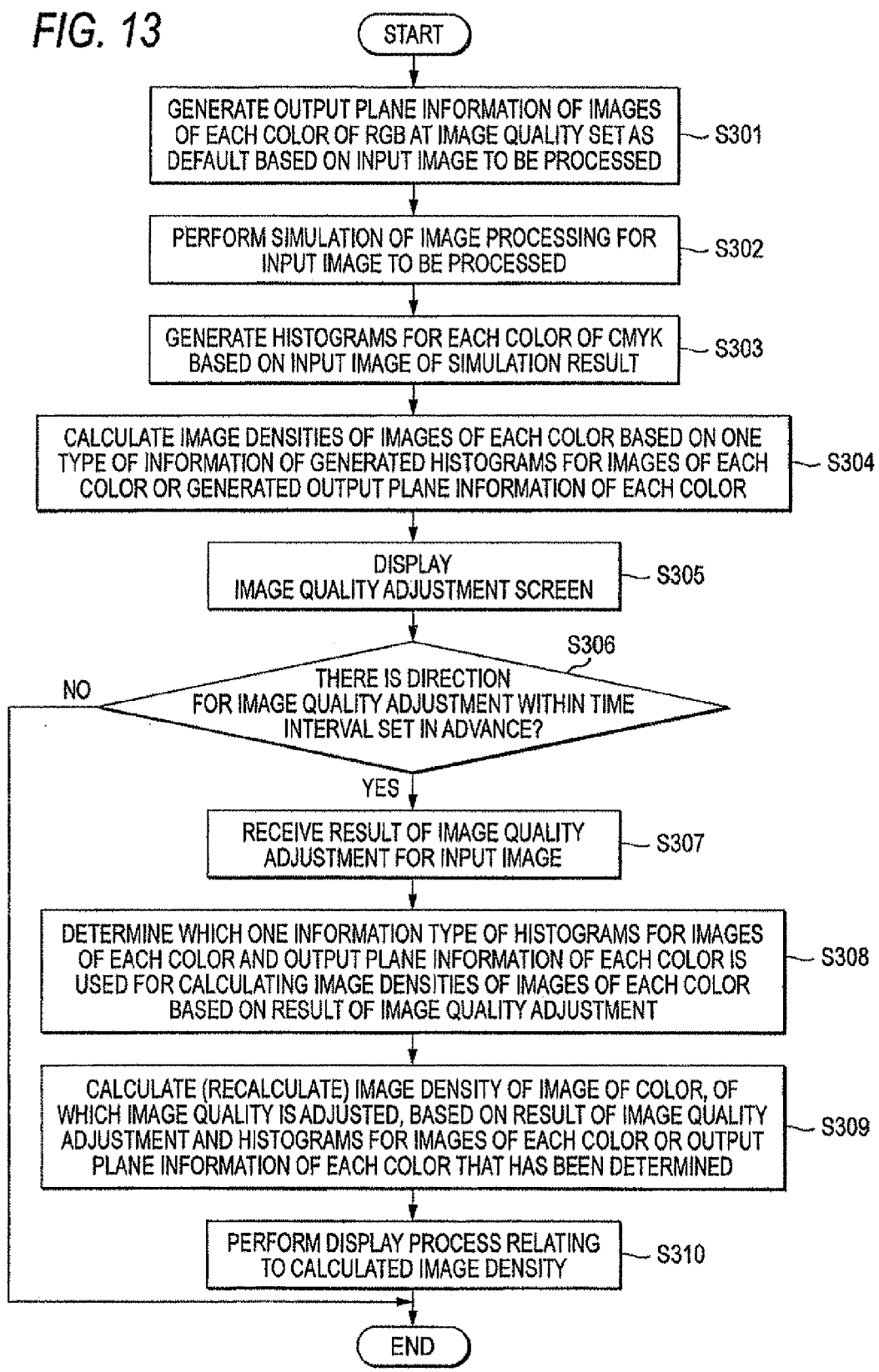
FIG. 13 is a flowchart representing the processing sequence of an image density calculating process of an image processing apparatus according to the third exemplary embodiment.

In addition, the memory device 12 stores various installed programs such as software (program) used for implementing the function of the image processing unit 100 (constituent elements 110 to 150 and 610 to 640) shown in FIG. 12, software (program) corresponding to the processing sequence of the image density calculating process shown in FIG. 13, software (program) corresponding to the processing sequence of the image density calculating process (a case where the image quality adjustment is color adjustment) shown in FIG. 14, and an image processing program 12A.

The image processing program 12A includes software (program) used for implementing the functions of the processing section 110, the histogram generating section 120, the image density calculating section 130, the image quality adjustment direction receiving section 140, the histogram changing section 150, the output plane generating section 610, the plane information selecting section 620, the image density algorithm determining section 630, and the execution unit 640 that are shown in FIG. 12. In the image processing unit 100, the histogram generating section 120 performs a first generation process, the output plane generating section 610 performs a second generation process, the image density calculating section 130 performs a calculation process, the image quality direction receiving section 140 performs a reception process, the image density algorithm determining section 630 performs a determination process, and the execution unit 640 performs an execution process.

Here, the execution unit 640 is configured by the image 15, density calculating section 130, the histogram changing section 150, and the plane information selecting section 620.

As given above, the exemplary embodiments of the present invention invented by the inventors have been described in detail. However, the exemplary embodiments disclosed here are examples in every aspect, and the present invention should not be construed as being limited to the disclosed technology. In other words, the technical scope of the present invention should not be construed as being limited to the description on the above-described exemplary embodiments but be construed by appended claims, and technology equivalent to the technology described in the claims and all the changes made within the basic concept of the claims are included therein.

In a case where a program is used, the program may be provided through a network or may be provided by being stored on a storage medium such as a CD-ROM.

In other words, the programs including the image processing program are not limited to being recorded in a storage device such as a hard disk. Thus, the programs may be provided as below.

For example, the programs are stored in the ROM, and the CPU may be configured to load the programs from the ROM into a main memory device and execute the programs.

Alternatively, the programs may be distributed by being stored on a computer-readable storage medium such as a DVD-ROM, a CD-ROM, an MO (magneto optical disk), or a flexible disk.

Furthermore, the image processing apparatus and the like may be connected to a server apparatus or a host computer through a communication line (for example, the Internet). In such a case, the programs are downloaded from the server apparatus or the host computer and then are executed. In the case, as a downloading area of the programs, a memory such as a RAM or a storage device (storage medium) such as a hard disk may be used.

INDUSTRIAL APPLICABILITY

In the description given above, a case where the image processing apparatus according to the present invention is applied to an image processing apparatus that generates histograms of CMYK has been represented. However, the image processing apparatus may be applied to an image processing apparatus that generates histograms of RGB.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first generating unit that generates a plurality of histograms of images with respect to each color based on an input image;
a second generating unit that generates output plane information with respect to each color based on the input image;
a calculating unit that calculates a plurality of first image densities of the images from at least one of the histograms and the output plane information;
a receiving unit that receives a content of image quality adjustment performed on the input image;
a determination unit that select one of the histograms and the output plane information to be used based on the content of the image quality adjustment; and
an executing unit that execute calculation process to calculates a second image density corresponding to one of the images on which the image quality adjustment is performed, based on the content and the selected one of the histograms and the output plane information.

2. The image processing apparatus according to claim 1, further comprising a displaying unit that displays the second image density in a case where the content is received by the receiving unit.

3. The image processing apparatus according to claim 1, further comprising a displaying unit that displays a value of a difference between the first image density and the second image density in the content is received by the receiving unit.

4. The image processing apparatus according to claim 1, further comprising:
- a first holding unit that holds a lowest image density out of a plurality of the second image density obtained by the calculation executed by the executing unit when a plurality of contents of the image quality adjustment which are different from each other are received in a time series by the receiving unit;
- a second holding unit that holds one of the contents corresponding to the lowest image density; and
- a displaying unit that displays contents of the first holding unit and the second holding unit.

5. A non-transitory computer readable medium storing a program causing a computer to execute a process for image processing, the process comprising:
- generating a plurality of histograms of images with respect to each color based on an input image;
- generating output plane information with respect to each color based on the input image;
- calculating a plurality of first image densities of the images from at least one of the histograms and the output plane information;
- receiving a content of image quality adjustment performed on the input image;
- selecting one of the histograms and the output plane information to be used based on the content of the image quality adjustment; and
- executing calculation to calculates a second image density corresponding to one of the images on which the image quality adjustment is performed, based on the content and the selected one of the histograms and the output plane information.

\* \* \* \* \*